(12) United States Patent
Mark

(10) Patent No.: US 10,226,103 B2
(45) Date of Patent: Mar. 12, 2019

(54) FOOTWEAR FABRICATION BY COMPOSITE FILAMENT 3D PRINTING

(71) Applicant: MARKFORGED, INC., Somerville, MA (US)

(72) Inventor: Gregory Thomas Mark, Cambridge, MA (US)

(73) Assignee: MARKFORGED, INC., Watertown, MA (US)

( * ) Notice: Subject to any disclaimer, the term of this patent is extended or adjusted under 35 U.S.C. 154(b) by 491 days.

(21) Appl. No.: 14/988,222

(22) Filed: Jan. 5, 2016

(65) Prior Publication Data

US 2016/0192741 A1 Jul. 7, 2016

Related U.S. Application Data

(60) Provisional application No. 62/100,023, filed on Jan. 5, 2015.

(51) Int. Cl.
*B29C 70/68* (2006.01)
*B29C 70/74* (2006.01)
(Continued)

(52) U.S. Cl.
CPC ........ *A43B 17/003* (2013.01); *A43B 23/0235* (2013.01); *A43B 23/0245* (2013.01);
(Continued)

(58) Field of Classification Search
CPC ......... A43D 8/22; B29C 64/118; B29C 70/68; B29C 70/681; B29C 70/682; B29C 70/74; B29D 35/00
(Continued)

(56) References Cited

U.S. PATENT DOCUMENTS

| 5,709,954 A | 1/1998 | Lyden et al. |
| 5,906,863 A | 5/1999 | Lombardi et al. |

(Continued)

FOREIGN PATENT DOCUMENTS

| EP | 2529910 A1 | 12/2012 |
| EP | 2594146 A1 | 5/2013 |

(Continued)

OTHER PUBLICATIONS

Geek magazine—hacker daily blog "To Skolkovo created the Russia's first composite 3D-printer", Feb. 24, 2015, Retreived from the Internet: <http://geek-mag.com/posts/246332/>.

(Continued)

*Primary Examiner* — Leo B Tentoni
(74) *Attorney, Agent, or Firm* — Lando & Anastasi, LLP

(57) ABSTRACT

A footwear insole shape is generated by supplying a core reinforced filament having a matrix material impregnating reinforcing strands aligned along the filament, as well as a fill material separately from the core reinforced filament and depositing at least one shell of fill material within an insole shape upon a print bed. The core reinforced filament is deposited to fuse to the fill material within a first reinforcing region formed with respect to the insole shape. A cutter upstream of the nozzle tip cuts the core reinforced filament, and a remainder of the core reinforced filament is deposited to complete the first reinforcing region. A nozzle tip applies pressure to continuously compact the core reinforced filament toward the insole shape as the core reinforced filament is fused to the fill material.

13 Claims, 25 Drawing Sheets

(51) Int. Cl.
  *B29D 35/00*  (2010.01)
  *A43D 8/22*  (2006.01)
  *A43B 17/00*  (2006.01)
  *A43B 23/02*  (2006.01)
  *B33Y 10/00*  (2015.01)
  *B33Y 80/00*  (2015.01)
  *B29C 64/118*  (2017.01)
  *B29C 64/106*  (2017.01)

(52) U.S. Cl.
  CPC .......... *B29C 64/106* (2017.08); *B29C 64/118* (2017.08); *B29C 70/681* (2013.01); *B29C 70/682* (2013.01); *B33Y 10/00* (2014.12); *B33Y 80/00* (2014.12)

(58) Field of Classification Search
  USPC ................ 264/138, 243, 255, 257, 259, 308
  See application file for complete search history.

(56) References Cited

U.S. PATENT DOCUMENTS

| | | | |
|---|---|---|---|
| 6,865,442 | B1 | 3/2005 | Jared |
| 7,093,379 | B2 | 8/2006 | Ellis, III |
| 7,206,718 | B2 | 4/2007 | Cavanagh et al. |
| 7,870,681 | B2 | 1/2011 | Meschter |
| 8,028,440 | B2 | 10/2011 | Sokolowski et al. |
| 8,162,022 | B2 | 4/2012 | Hull et al. |
| 8,312,645 | B2 | 11/2012 | Dojan et al. |
| 8,321,984 | B2 | 12/2012 | Dojan et al. |
| 8,388,791 | B2 | 3/2013 | Dojan et al. |
| 8,429,835 | B2 | 4/2013 | Dojan et al. |
| 8,572,866 | B2 | 11/2013 | Dojan et al. |
| 8,578,535 | B2 | 11/2013 | Dojan et al. |
| 8,904,671 | B2 | 12/2014 | Dojan et al. |
| 8,993,061 | B2 | 3/2015 | Jones et al. |
| 9,005,710 | B2 | 4/2015 | Jones et al. |
| 9,149,988 | B2 | 10/2015 | Mark et al. |
| 9,179,739 | B2 | 11/2015 | Bell et al. |
| 9,676,159 | B2 | 6/2017 | Sterman et al. |
| 2003/0009308 | A1 | 1/2003 | Kirtley |
| 2004/0133431 | A1 | 7/2004 | Udiljak et al. |
| 2005/0282454 | A1 | 12/2005 | Meschter et al. |
| 2006/0065499 | A1 | 3/2006 | Smaldone et al. |
| 2007/0039209 | A1 | 2/2007 | White et al. |
| 2007/0163147 | A1 | 7/2007 | Cavanagh et al. |
| 2009/0126225 | A1 | 5/2009 | Jarvis |
| 2010/0095557 | A1 | 4/2010 | Jarvis |
| 2012/0055044 | A1 | 3/2012 | Dojan et al. |
| 2012/0117822 | A1 | 5/2012 | Jarvis |
| 2013/0104423 | A1 | 5/2013 | Hatfield et al. |
| 2014/0020191 | A1 | 1/2014 | Jones et al. |
| 2014/0020192 | A1 | 1/2014 | Jones et al. |
| 2014/0202042 | A1 | 7/2014 | Berend et al. |
| 2014/0250723 | A1 | 9/2014 | Kohatsu |
| 2014/0259786 | A1 | 9/2014 | Heard et al. |
| 2014/0291886 | A1 | 10/2014 | Mark et al. |
| 2014/0361460 | A1 | 12/2014 | Mark |

FOREIGN PATENT DOCUMENTS

| | | |
|---|---|---|
| EP | 2649898 A1 | 10/2013 |
| WO | 9000358 A1 | 1/1990 |
| WO | 2009009137 A1 | 1/2009 |
| WO | 2014009587 A1 | 1/2014 |
| WO | 2014014977 A2 | 1/2014 |
| WO | 2014080217 A1 | 5/2014 |

OTHER PUBLICATIONS

This 3D printer could allow ISS components to be created in space—YouTube. Published on May 20, 2016. Retrieved from the Internet: <URL:<https://www.youtube.com/watch?v=YwrTfOjEFtw>.

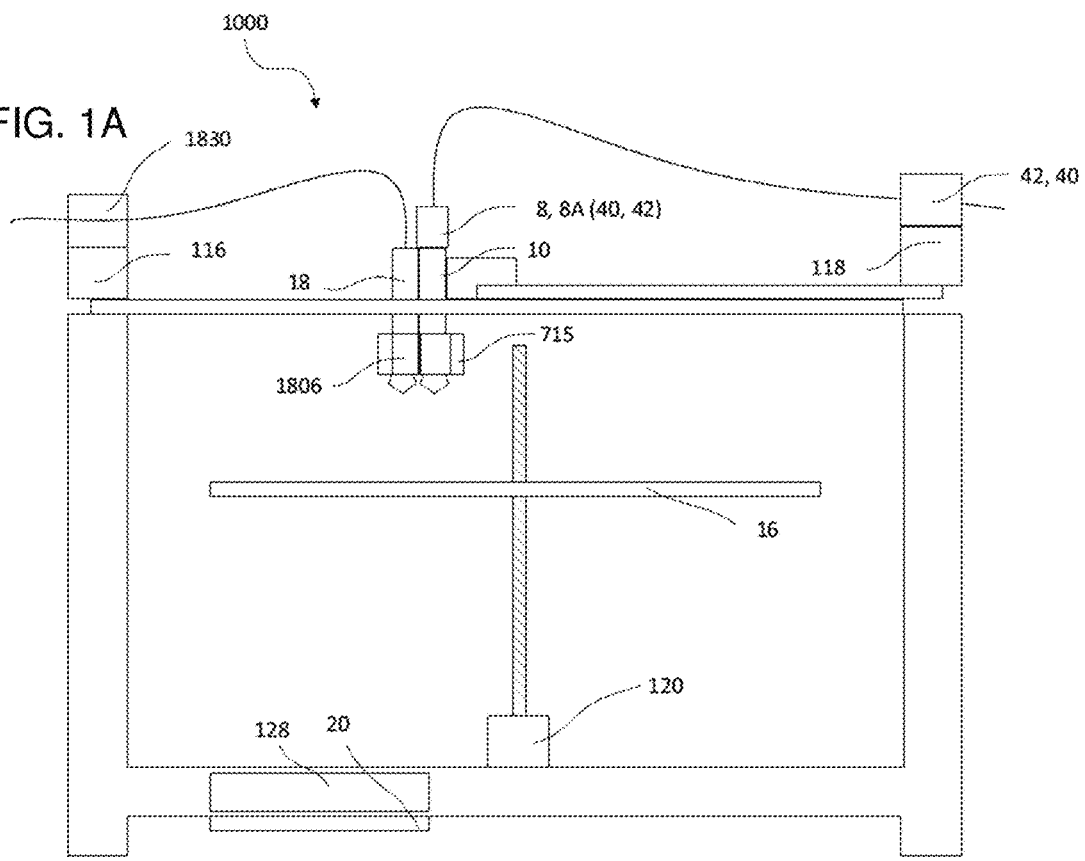

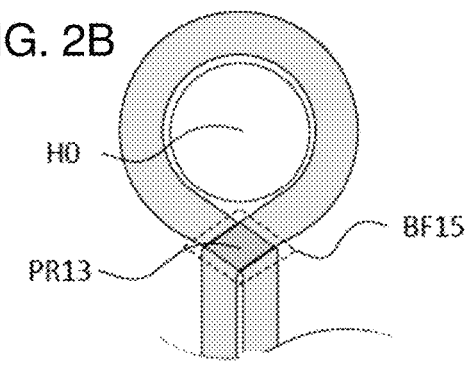
FIG. 2B
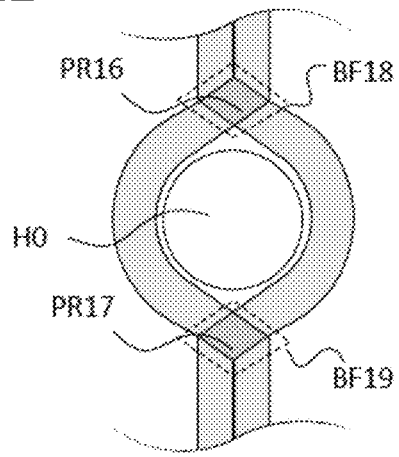
FIG. 2E
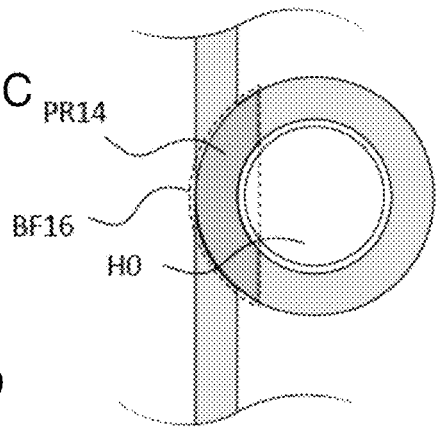
FIG. 2C
FIG. 2D
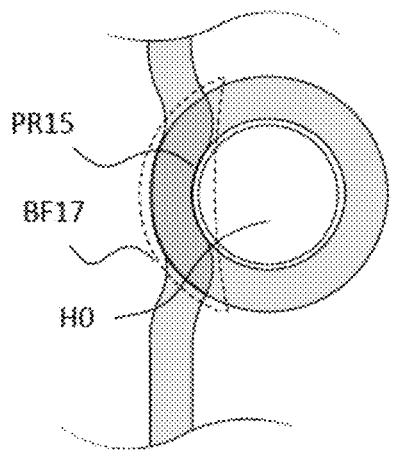
FIG. 2F
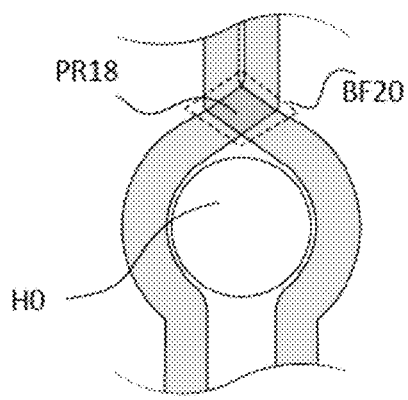

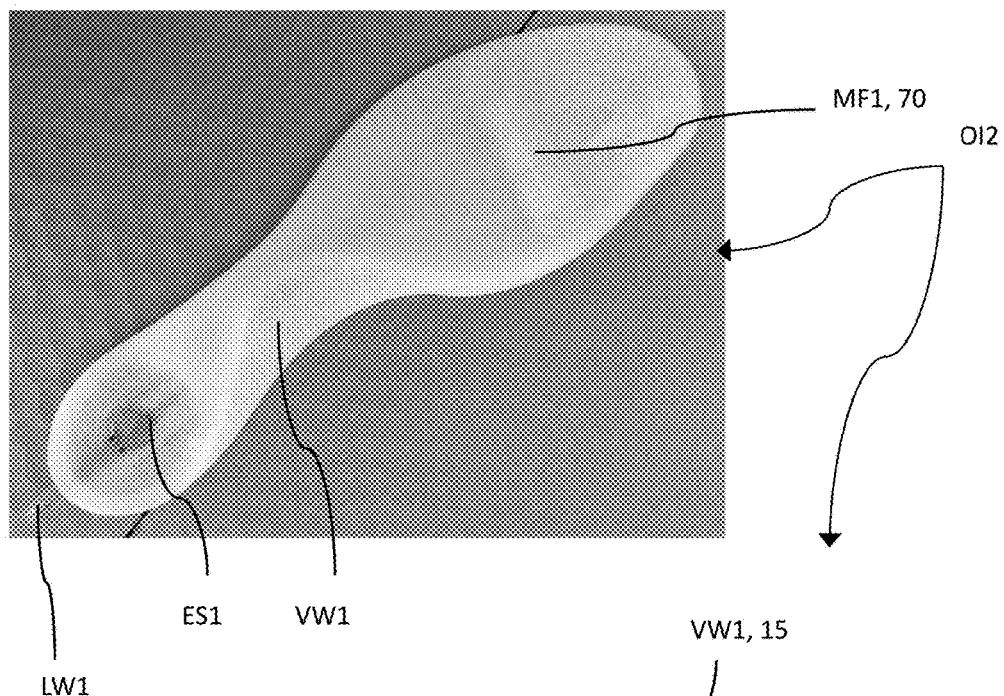

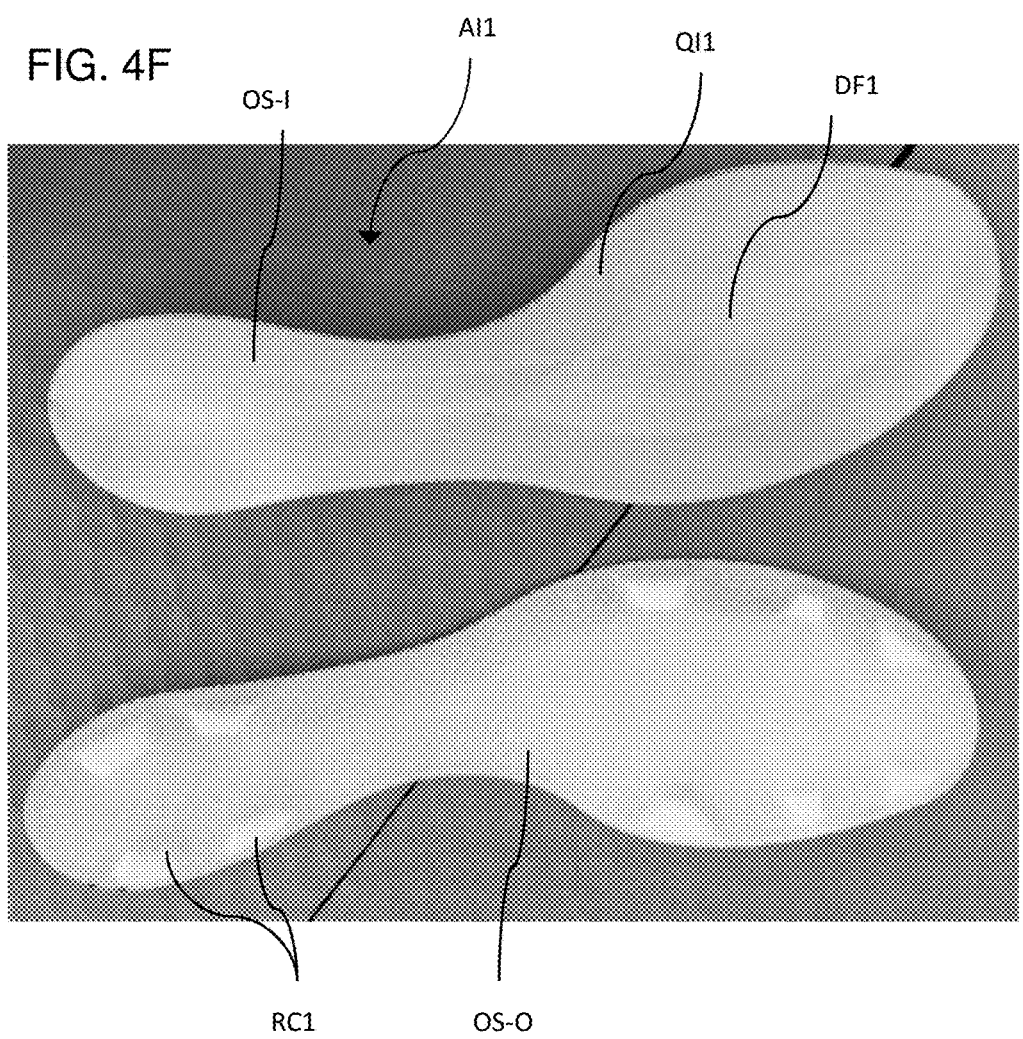

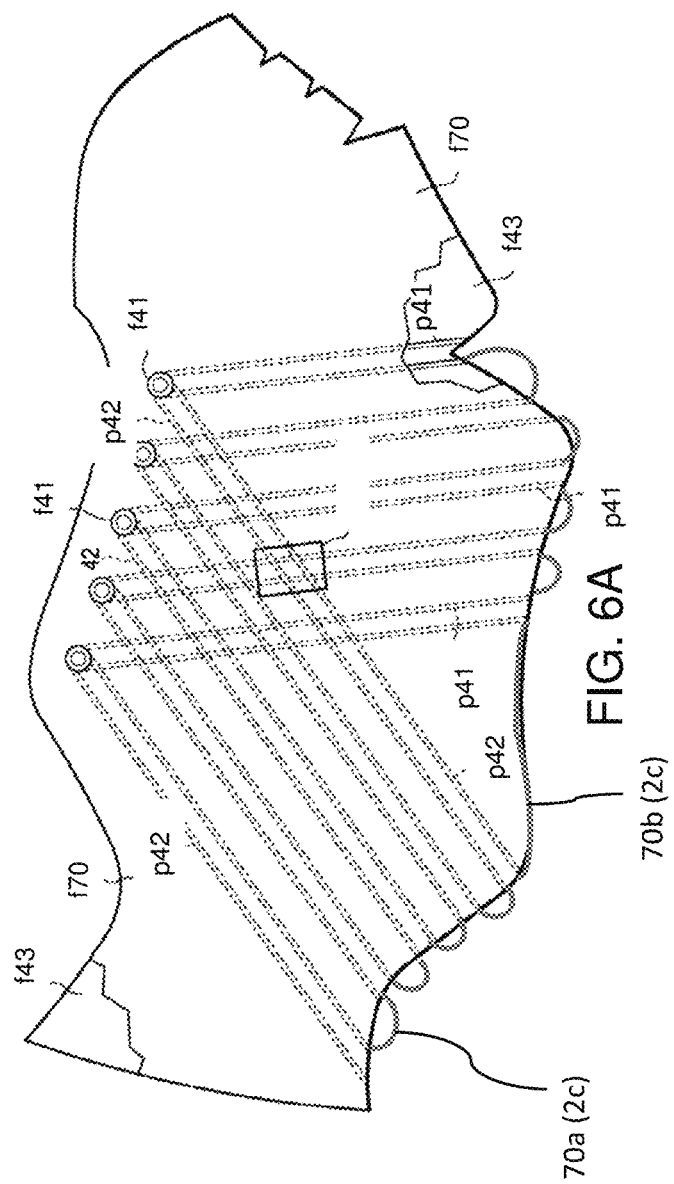

US 10,226,103 B2

FOOTWEAR FABRICATION BY COMPOSITE FILAMENT 3D PRINTING

CROSS-REFERENCE TO RELATED APPLICATIONS

This application claims the benefit under 35 U.S.C. § 119(e) of U.S. provisional application Ser. No. 62/100,023 filed Jan. 5, 2015, the disclosure of which is incorporated by reference in its entirety. This application further incorporates the following disclosures by reference in their entireties: U.S. patent application Ser. Nos. 14/222,318; 14/297,437; 14/333,881; and 14/944,088.

FIELD

Aspects relate to three dimensional printing.

BACKGROUND

In Composite Filament Fabrication ("CFF"), toolpaths may be generated, traced and/or followed by an continuous fiber composite reinforced 3D printer, in the form of deposited bonded ranks or composite swaths. Toolpaths may follow contours (e.g., within an offset path parallel to a contour), follow patterns (e.g., boustrophedon rows, or spirals), may form transitions between offsets and printed areas, e.g., form a crossover from one offset to an adjacent offset. A core reinforced fiber toolpath may be cloned into an adjacent layer (e.g., "cloned" meaning identically), or reproduced with changes that avoid stacking seams or stress concentrations. Different core reinforced toolpaths having a different directions of reinforcement may be used in different layers.

As discussed in the present disclosure, the deposited bonded ranks or composite swaths of composite filament, together with complementary formations of matrix material and/or fill material, may reinforce articles of footwear or parts thereof in different ways.

SUMMARY

According to a first aspect or embodiment, a method of reinforcing a footwear insole shape includes supplying a core reinforced filament having a matrix material impregnating reinforcing strands aligned along the filament, and supplying a fill material separately from the core reinforced filament. At least one shell of fill material within an insole shape is deposited upon a print bed, and the core reinforced filament is deposited to fuse to the fill material within a first reinforcing region formed with respect to the insole shape. A cutter upstream of the nozzle tip is actuated to cut the core reinforced filament. A remainder of the core reinforced filament is deposited to complete the first reinforcing region, and pressure is applied with a nozzle tip to continuously compact the core reinforced filament toward the insole shape as the core reinforced filament is fused to the fill material.

Optionally, reinforcing strands are formed from a continuous elongated fiber material having an elastic modulus more than ten times that of the fill material of the insole shape. Further optionally, a first reinforcing region is deposited to stiffen a medial rearfoot side of the insole shape. Additionally, or alternatively, a first reinforcing region is deposited one of beside a lateral rearfoot skive or below an upward extension of a medial rearfoot border; and/or the first reinforcing region is deposited to stiffen a lateral rearfoot side of the insole shape. The first reinforcing region may be deposited one of beside a medial rearfoot skive or below an upward extension of a lateral rearfoot border.

The first reinforcing region may be deposited to form a sandwich panel in which a lower fiber reinforced shell is separated from an upper fiber reinforced shell by at least ⅛ inch. In the alternative, the first reinforcing region is deposited with a plurality of fiber swath segments extending in a common fiber direction to form a first anisotropic reinforcement region having at least one material property oriented in a first direction.

The embodiment may further include, after the cutting, depositing the core reinforced filament to fuse to the fill material to form a second anisotropic reinforcement region having at least one material property oriented in a second direction different from the first direction. The first reinforcing region may be deposited in successive shells that vary evenly in fiber direction to form a substantially isotropic reinforcement region having at least one substantially evenly distributed material property. The first reinforcing region may be deposited in successive shells that vary in fiber direction to form a quasi-isotropic rock plate that resists penetration of piercing obstacles.

In another aspect or embodiment, an article of footwear includes an insole shape including at least one shell of deposited fill material, and a first reinforcing region includes at least one shell embedding a core reinforced filament continuously compacted under pressure toward the insole shape and fused to the deposited fill material. The core reinforced filament may include a matrix material impregnating reinforcing strands aligned along the filament, and wherein the reinforcing strands are formed from a continuous elongated fiber material having an elastic modulus more than ten (10) times that of the fill material of the insole shape. The first reinforcing region may have been deposited to stiffen one of a lateral or medial side of the footwear insole shape. The first reinforcing region may form a sandwich panel in which a lower fiber reinforced layer is separated from an upper fiber reinforced layer by at least ⅛ inch.

In a further aspect or embodiment, a method of reinforcing a footwear upper includes supplying a core reinforced filament having a matrix material impregnating reinforcing strands aligned along the filament, as well as supplying a fill material separately from the core reinforced filament and depositing at least one shell of fill material within an upper shape upon a print bed. The core reinforced filament is deposited to fuse to the fill material within a first reinforcing region formed with respect to the upper shape, and a cutter upstream of the nozzle tip is actuated to cut the core reinforced filament. A remainder of the core reinforced filament is deposited to complete the first reinforcing region. Pressure is applied with a nozzle tip to continuously compact the core reinforced filament toward the upper shape as the core reinforced filament is fused to the fill material.

Optionally, the core reinforced filament is deposited to form at least one loop of fiber embedded composite swath and at least one loop of fill material about a lace aperture formed in the upper shape. In the alternative, or in addition, depositing at least one shell of fill material within an upper shape upon a print bed may include depositing at least one shell of fill material within a fabric upper shape held upon a print bed; and/or depositing the at least one shell of fill material to form an outer perimeter of an upper shape upon a print bed. The method may further include forming upper shape into a foot receiving shape; and affixing a perimeter of the upper shape to the perimeter of a sole. The reinforcing strands may be formed from a continuous elongated fiber material having an elastic modulus more than ten times that of the fill material of the upper shape.

Further optionally, the method may include, after the cutting, depositing the core reinforced filament to fuse to the fill material to form a second anisotropic reinforcement region having at least one material property oriented in a second direction different from the first direction. In addition, or in the alternative, the first reinforcing region may be deposited in successive shells that vary evenly in fiber direction to form a substantially isotropic reinforcement region having at least one substantially evenly distributed material property. The depositing of the core reinforced filament may include depositing the core reinforced filament to form at least one loop of fiber embedded composite swath about every lace aperture formed in the upper shape. Optionally, the depositing the core reinforced filament may include depositing the core reinforced filament to form at least one loop of fiber embedded composite swath about a lace aperture formed in the upper shape and at least one loop of fiber embedded composite swath at a perimeter of the upper shape for affixing to the perimeter of a sole.

The one or more loops of fiber embedded composite swath for affixing to the perimeter of a sole may be printed to surround one lace aperture, extend to the perimeter of the upper, follow the perimeter of the upper for at least one quarter of the sole length, then return to loop a second lace aperture. The depositing the core reinforced filament may include depositing a reinforcement patch to reinforce at least one of a wear and a stress area of the upper shape; and/or depositing a reinforcement ring to limit stretching of an underlying base layer of material.

In a further aspect or embodiment, an article of footwear, comprises an upper shape including at least one shell of deposited fill material as well as a first reinforcing region including at least one shell embedding a core reinforced filament continuously compacted under pressure toward the upper shape and fused to the deposited fill material. The core reinforced filament may include a matrix material impregnating reinforcing strands aligned along the filament, and wherein the reinforcing strands are formed from a continuous elongated fiber material having an elastic modulus more than ten (10) times that of the fill material of the upper shape. The first reinforcing region may loop and reinforces lace apertures on one of a lateral or medial side of the upper shape. Optionally, the first reinforcing region may loop from a lace aperture to the perimeter of the upper, follow the perimeter of the upper for at least one quarter of the sole length, and return to loop a second lace aperture.

FIGURES

FIG. 1A is a schematic view of a continuous core reinforced filament deposition and fill material filament extrusion printer.

FIGS. 2B-2F shows various crossing turns made about a hole (e.g., a lace aperture or through hole), in reinforcement formations of composite swath or multi-swath track approaches near the center of the hole and departs beside and parallel to its entry; approached near a tangent to the hole and departs from the hole opposite to and parallel to its entry; and in which a bight, open loop or touching loop may be made away from the reinforced hole from which the reinforcement formation of composite swath or multi-swath track returns toward the hole.

FIGS. 3A-3D show patch fills and concentric fills that may be used to fill in reinforcement regions as disclosed herein.

Figure 4A:
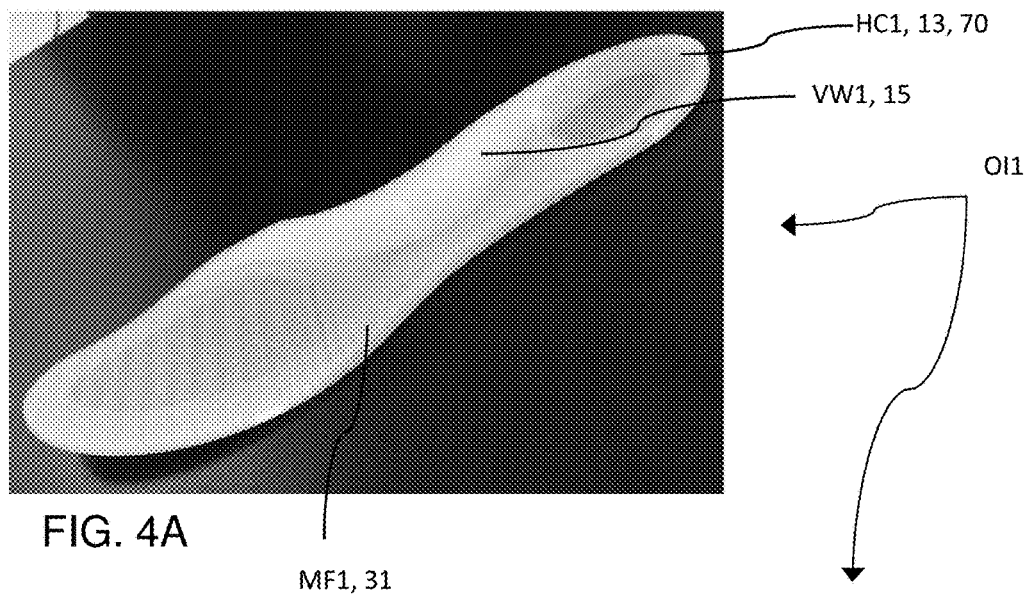
Figure 4B:
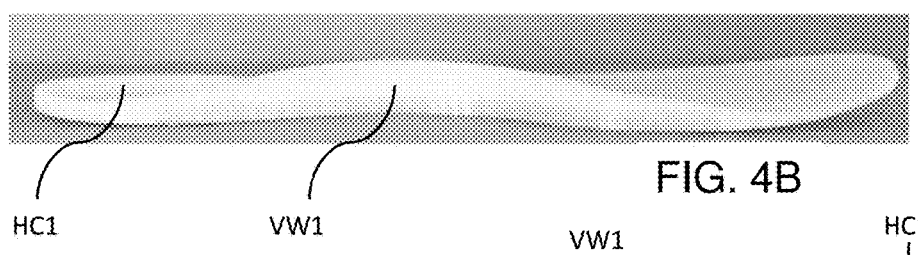
Figure 4C:
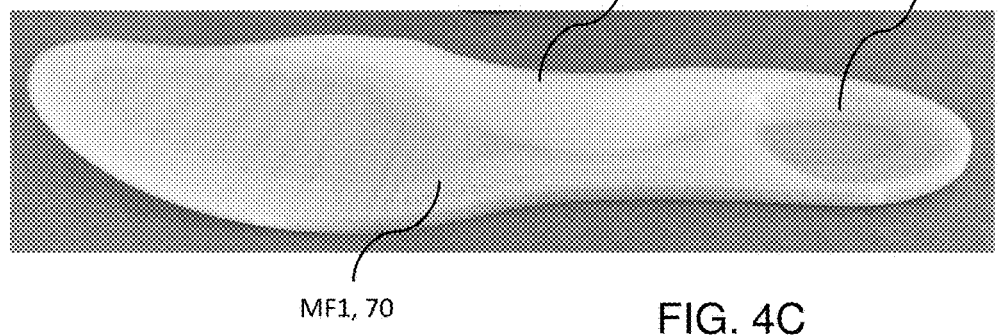

FIGS. 4A-4C show a first exemplary insoles, orthotic or insert, in which a heel cup formed in an insert formed including fill material is reinforced by composite swath tracks, and in which a bending area behind metatarsal prominences is reinforced by composite swath tracks; and a varus wedge is formed including fill material.

FIGS. 4D-4E show a second exemplary insole, orthotic or inserts, in which a heel cup formed in an insert including fill material includes a pressure transducer overmolded into the insert; and in which a sparse infill pattern is exposed at top and/or bottom surface to allow air flow through the insert.

FIG. 4F shows an exemplary sole or outsole, in which dense fill of fiber swaths and/or quasi isotropic multi-layer formation of fiber swaths increases stiffness and/or forms a piercing barrier versus sharp objects; and in which cleats on the outsole outer side are integrally formed of fill material.

Figure 4G:
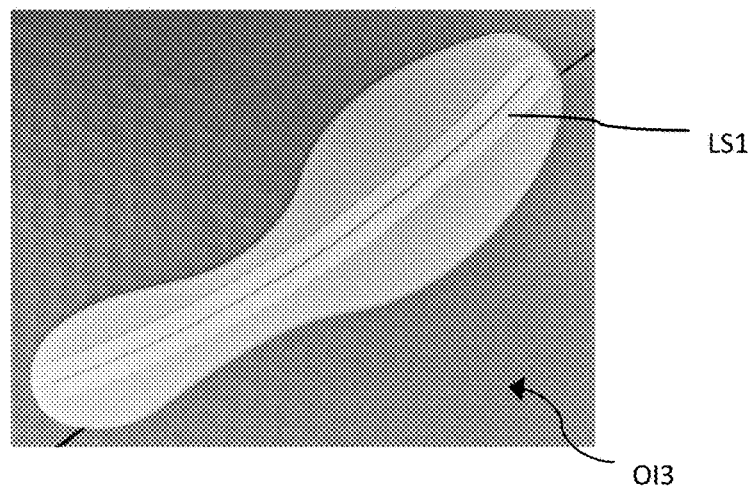
Figure 4H:
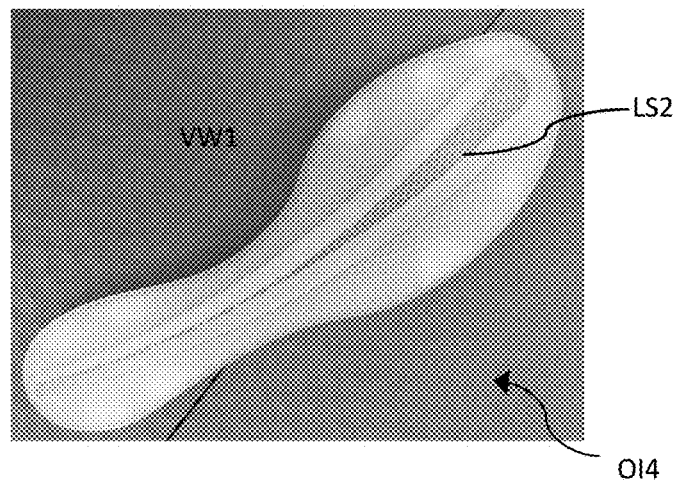
Figure 4I:
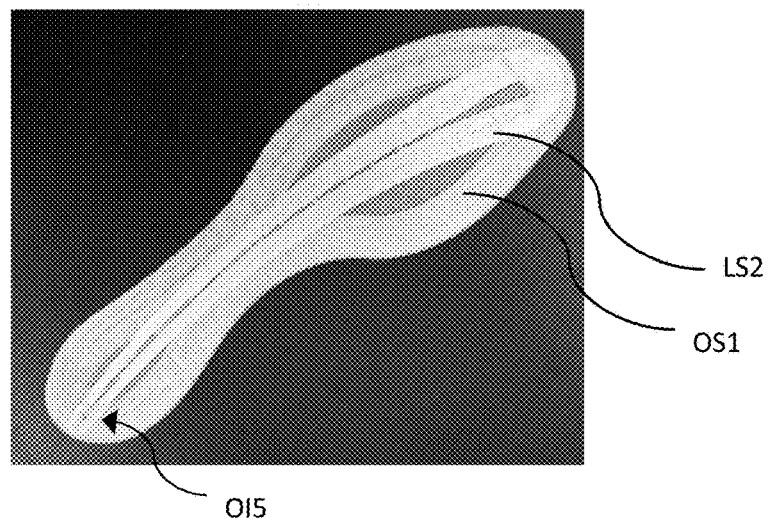

FIGS. 4G-4I show third through fifth exemplary insoles, orthoses or inserts in which stiffening patterns are formed in the longitudinal direction, tracing a line of progressive contact of the foot with the ground. The stiffening patterns are alternatively or in addition integrated or provided in outsoles or soles.

Figures 4J, 4K:
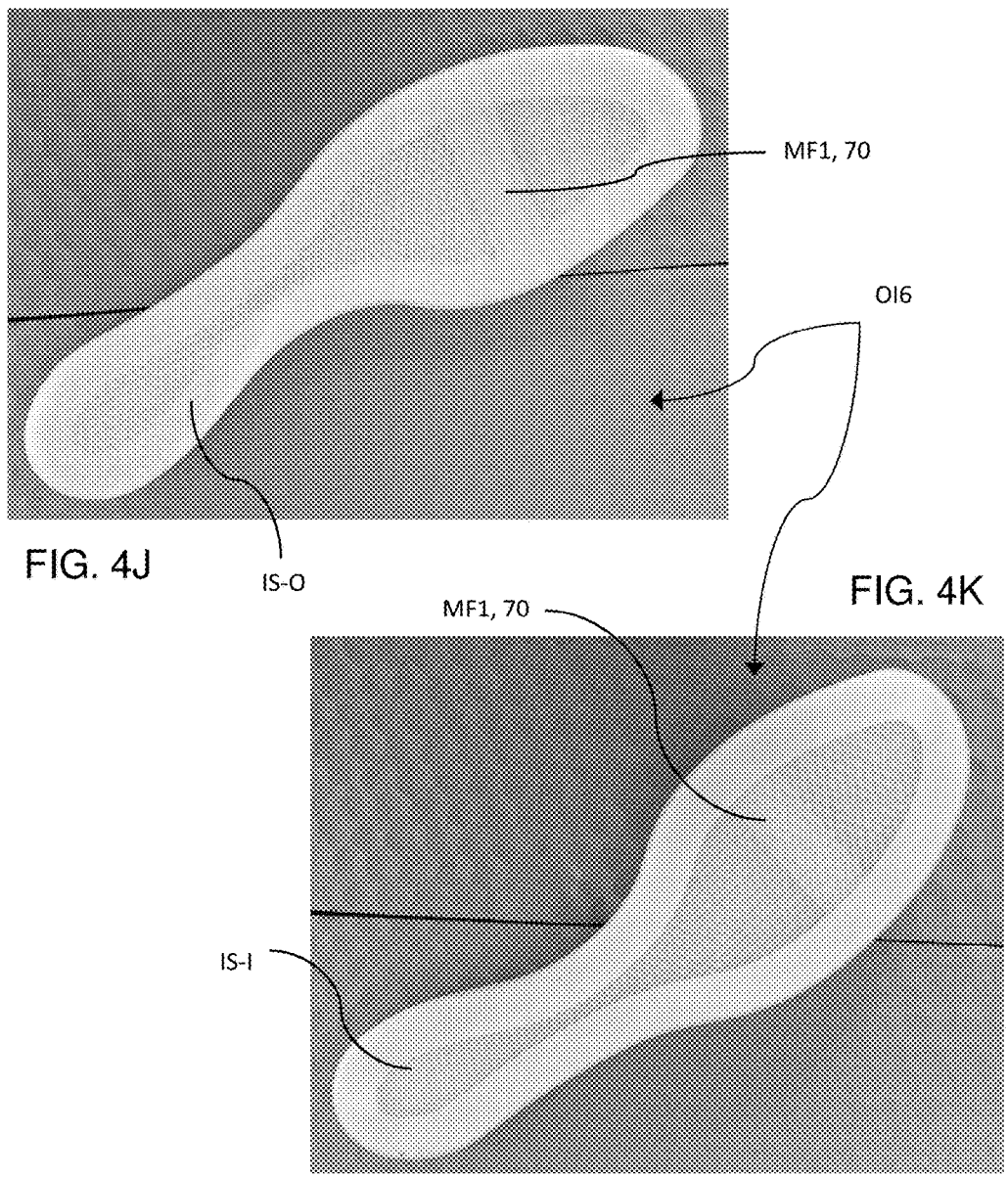

FIGS. 4J and 4K show a sixth exemplary insoles, orthoses or inserts in which a stiffening patterns is formed in the transverse direction at an approximate metatarsal location, along a lateral line of bending of the foot with the ground. The stiffening patterns are alternatively or in addition integrated or provided in outsoles or soles. A different pattern is formed on each of inner and outer surface of the exemplary member.

Figure 5A:
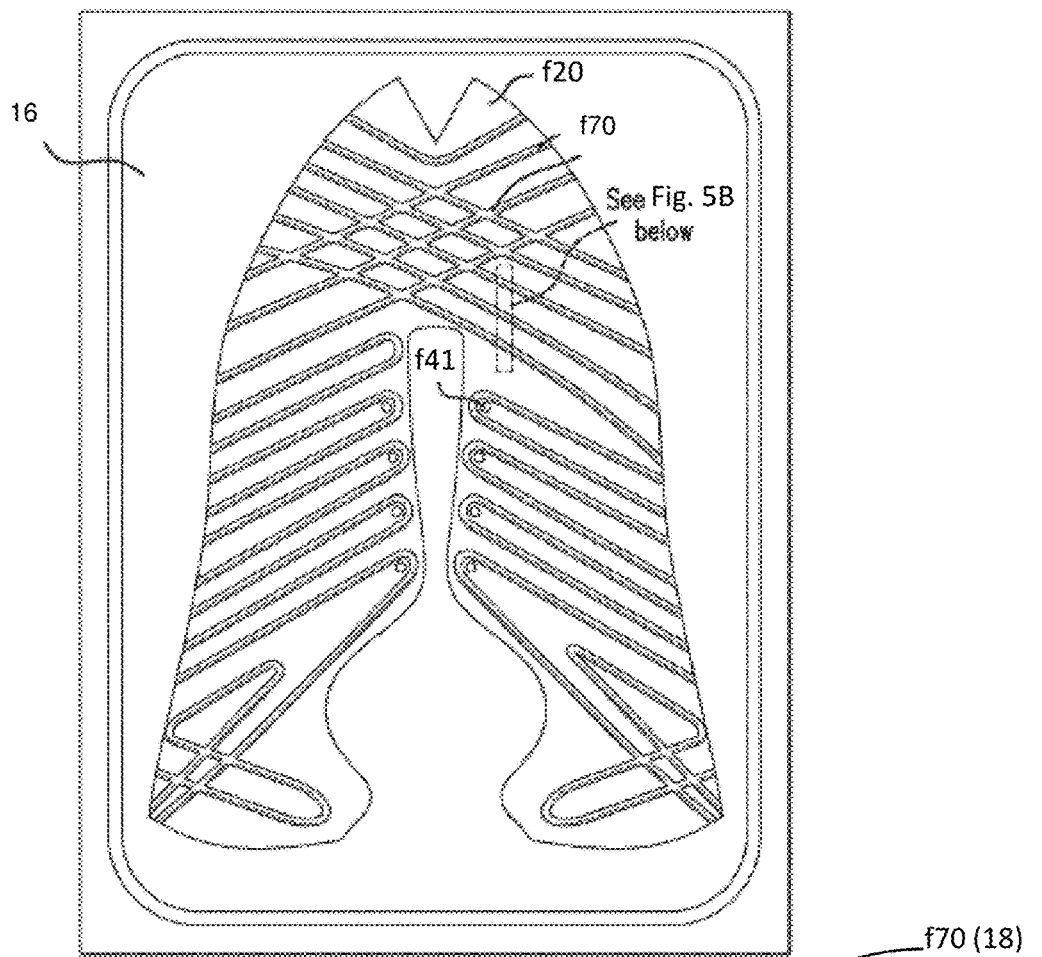

FIGS. 5A-5D show a first exemplary upper reinforced by fiber swaths, in which loops about lace apertures and reinforcing long swath patterns are formed. FIG. 5A shows an "unfolded" upper or upper blank in a printing configuration.

Figure 5B:
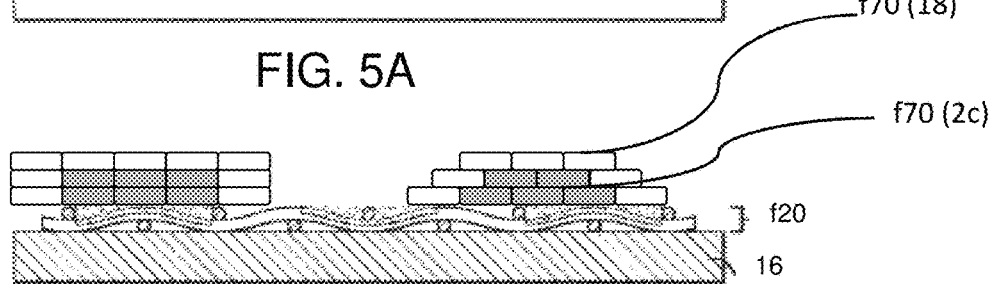
Figure 5C:
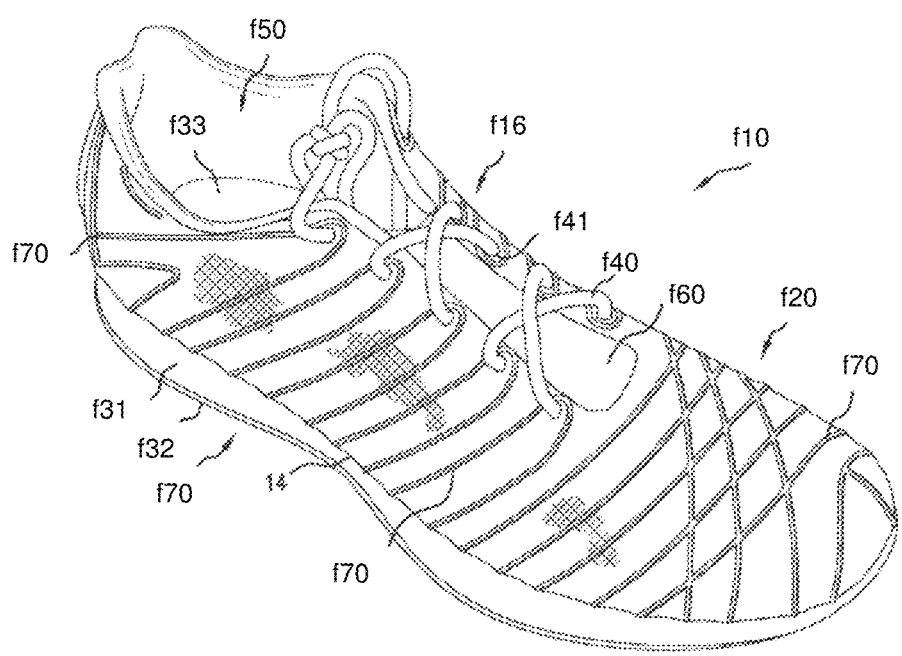
Figure 5E:
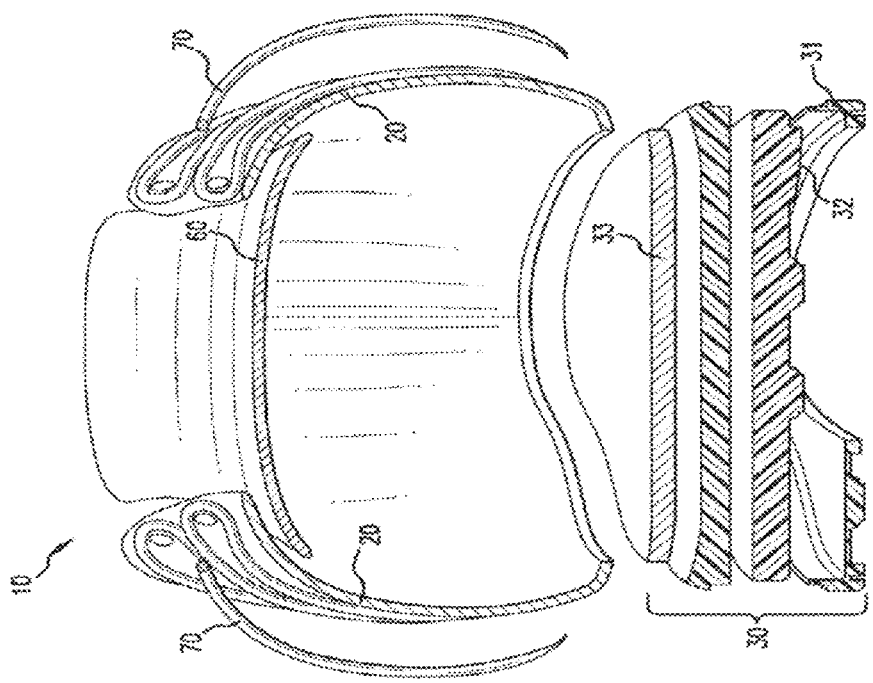
Figure 5D:
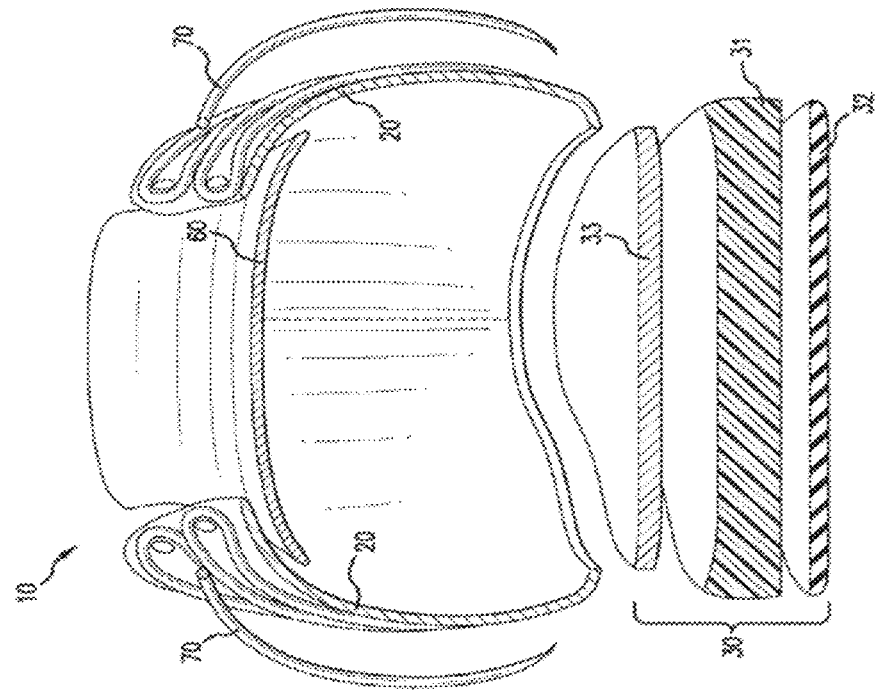

FIG. 5E shows a second exemplary upper reinforced by fiber swaths, in which reinforcing patterns are formed as isolated islands within or upon the upper.

FIGS. 6A-6D show a third exemplary upper reinforced by fiber swaths, in which crossing loops about lace apertures and crossing reinforcing long swath patterns are formed.

Figure 6B:
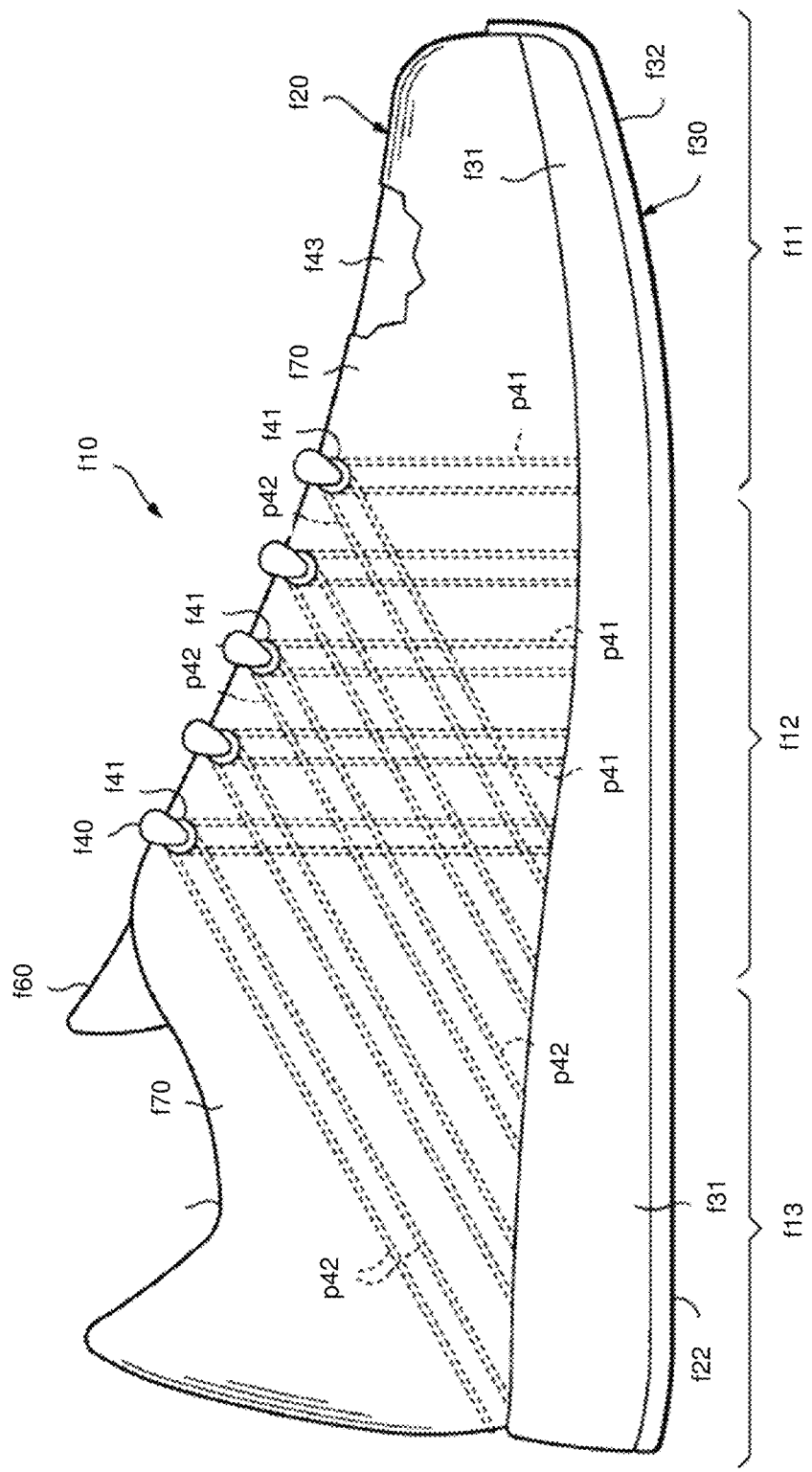
Figure 6C:
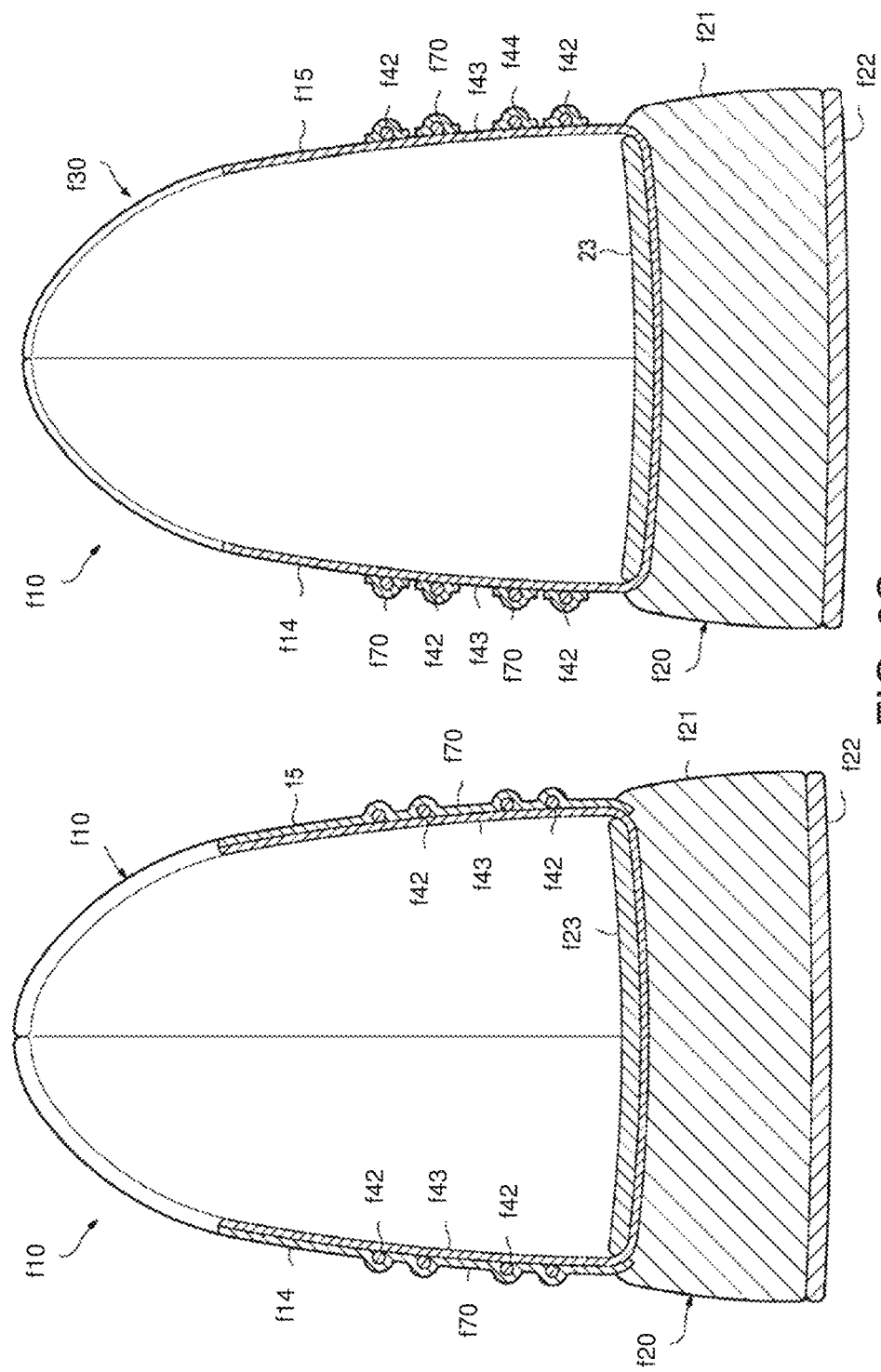
Figure 6D:
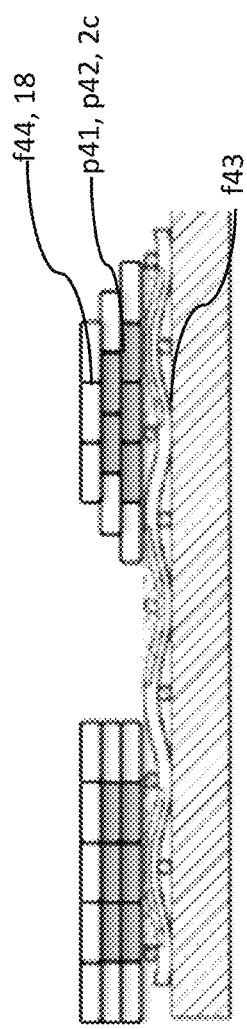
Figure 6E:
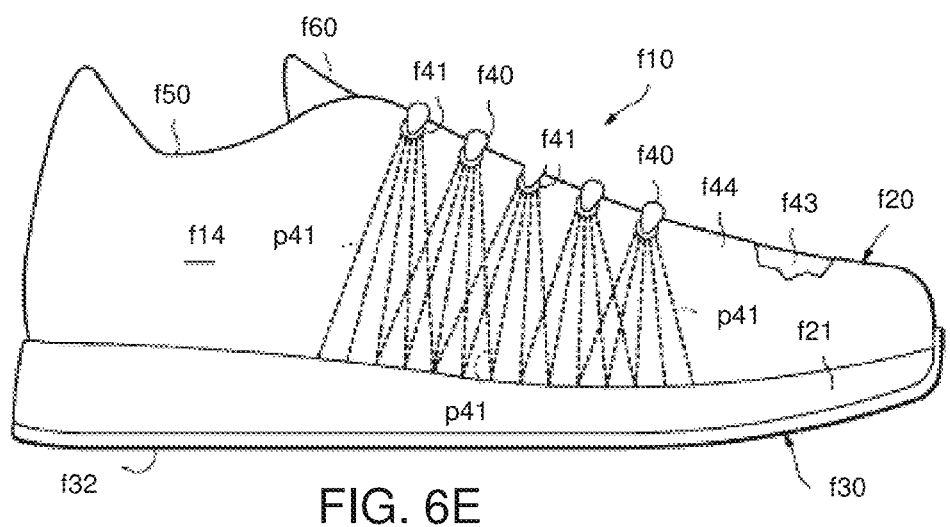
Figure 6F:
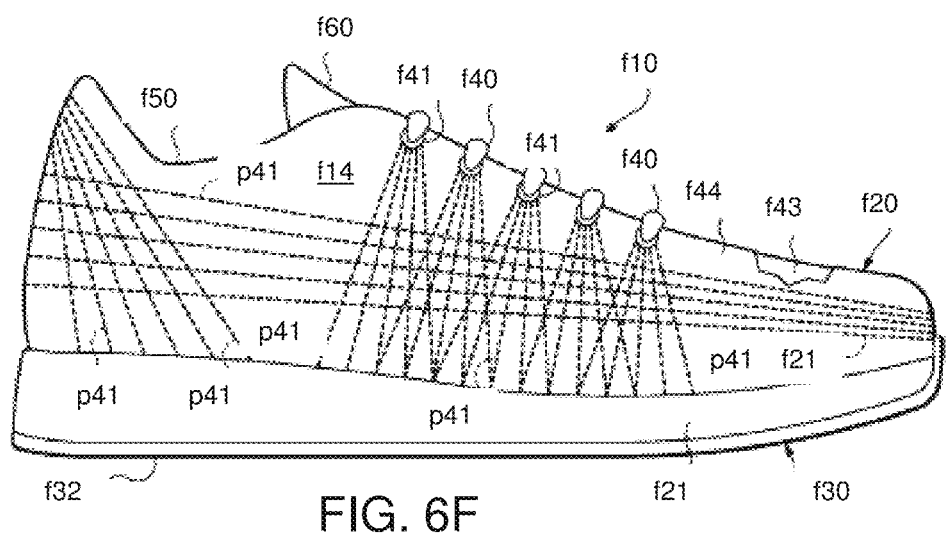

FIGS. 6E and 6F show a fourth and fifth exemplary uppers reinforced by fiber swaths, in which fanning loops about lace apertures and fanning & crossing reinforcing long swath patterns are formed.

Figure 6G:
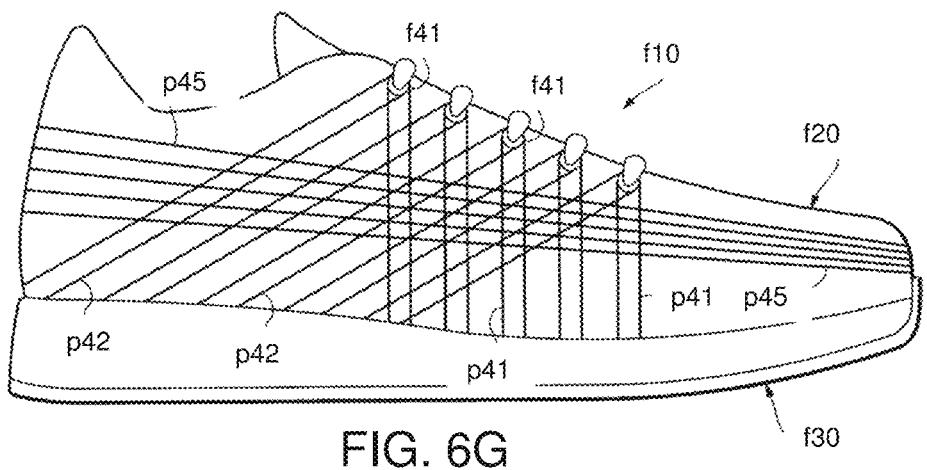

FIG. 6G shows a sixth exemplary upper reinforced by fiber swaths, in which crossing loops about lace apertures and fanning & crossing reinforcing long swath patterns are formed.

Figure 6H:
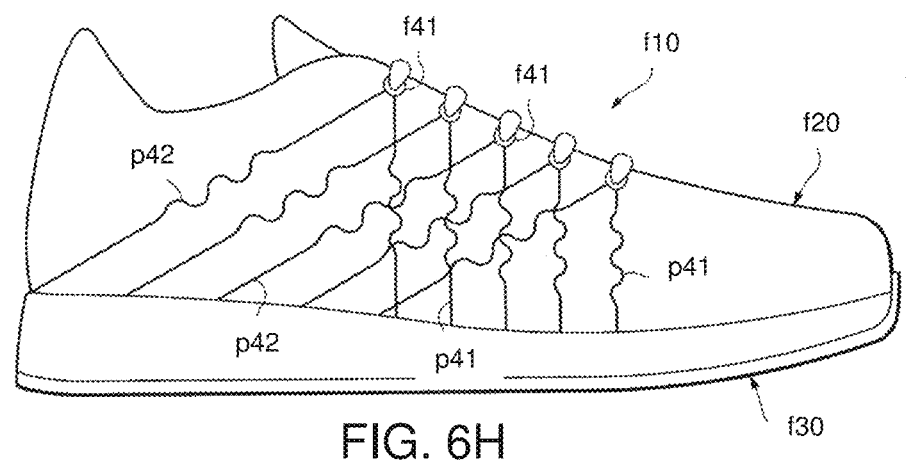

FIG. 6H shows a seventh exemplary upper reinforced by fiber swaths, in which crossing loops about lace apertures and crossing reinforcing long swath patterns are formed, and in which elastic behavior mesostructures are printed into the long swaths.

FIGS. 7A-7E show reinforcing regions formed of patterns of fiber swaths, including patch, concentric ring, offset, and/or spiral patterns.

DETAILED DESCRIPTION

Figure 1B:
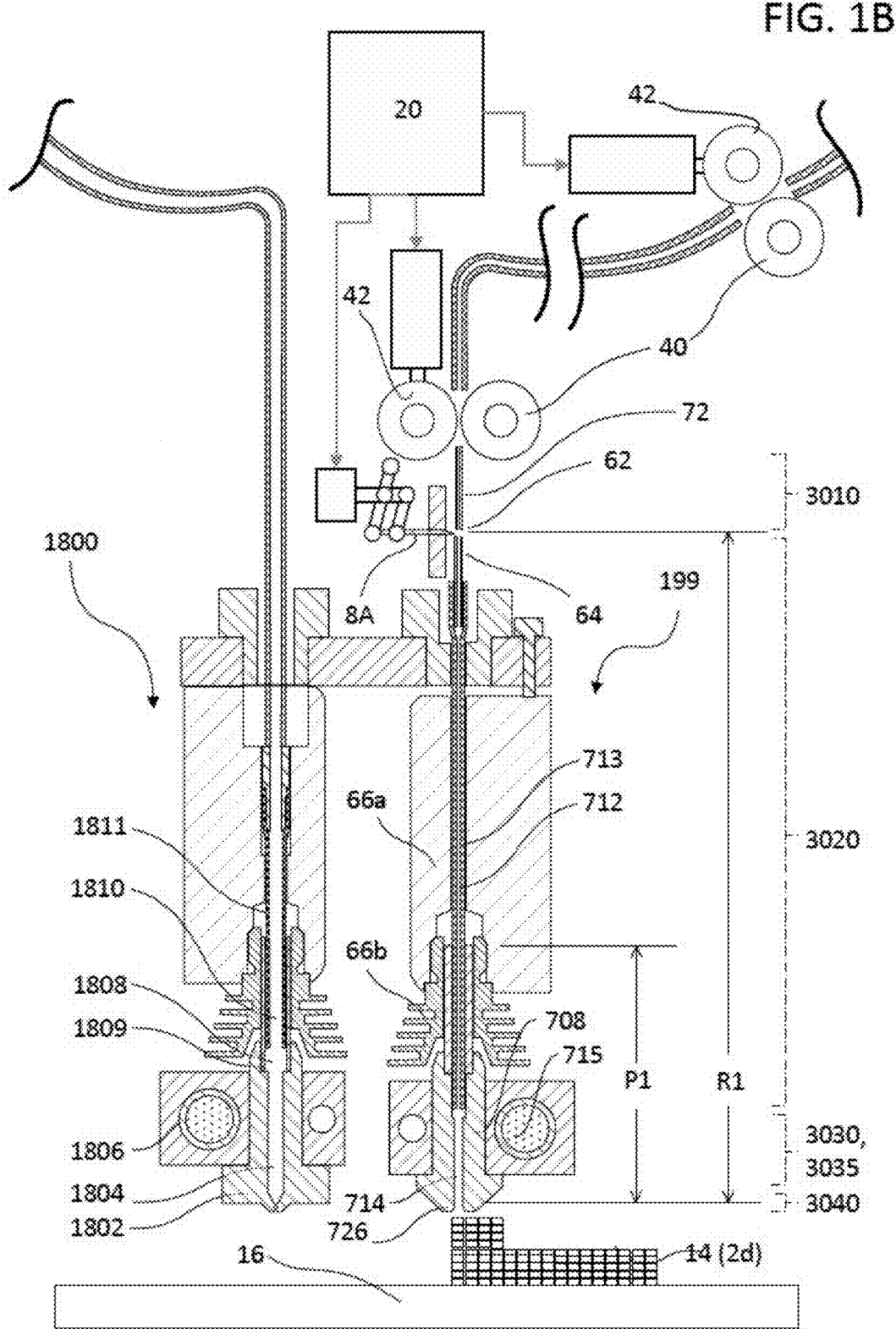
FIG. 1B is a close-up cross-section of a dual mode printhead assembly.
Figure 1C:
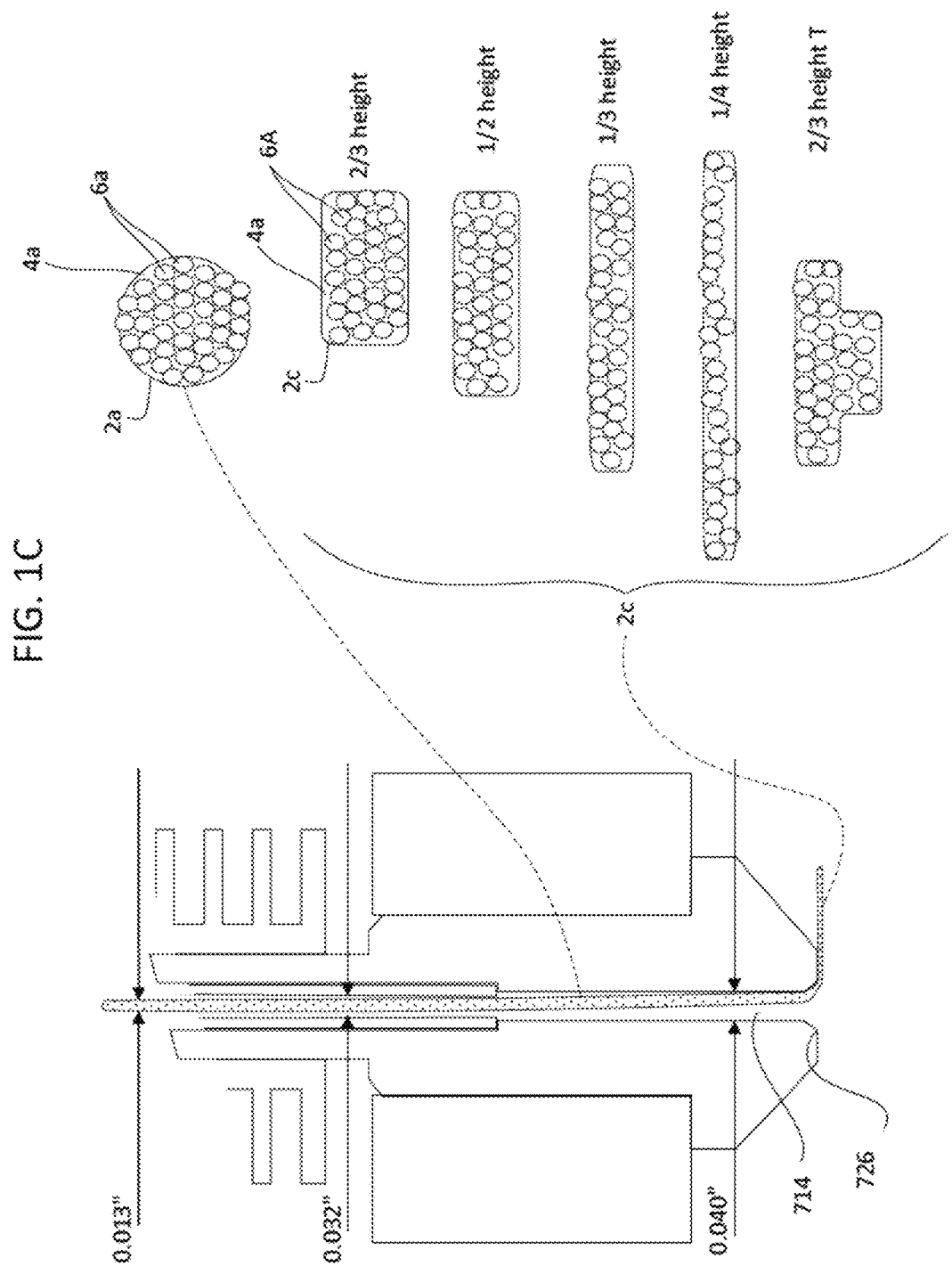
FIG. 1C is a close-up cross-section of a fiber printhead assembly and a set of different possible compression/consolidation shapes.
Figure 1D:
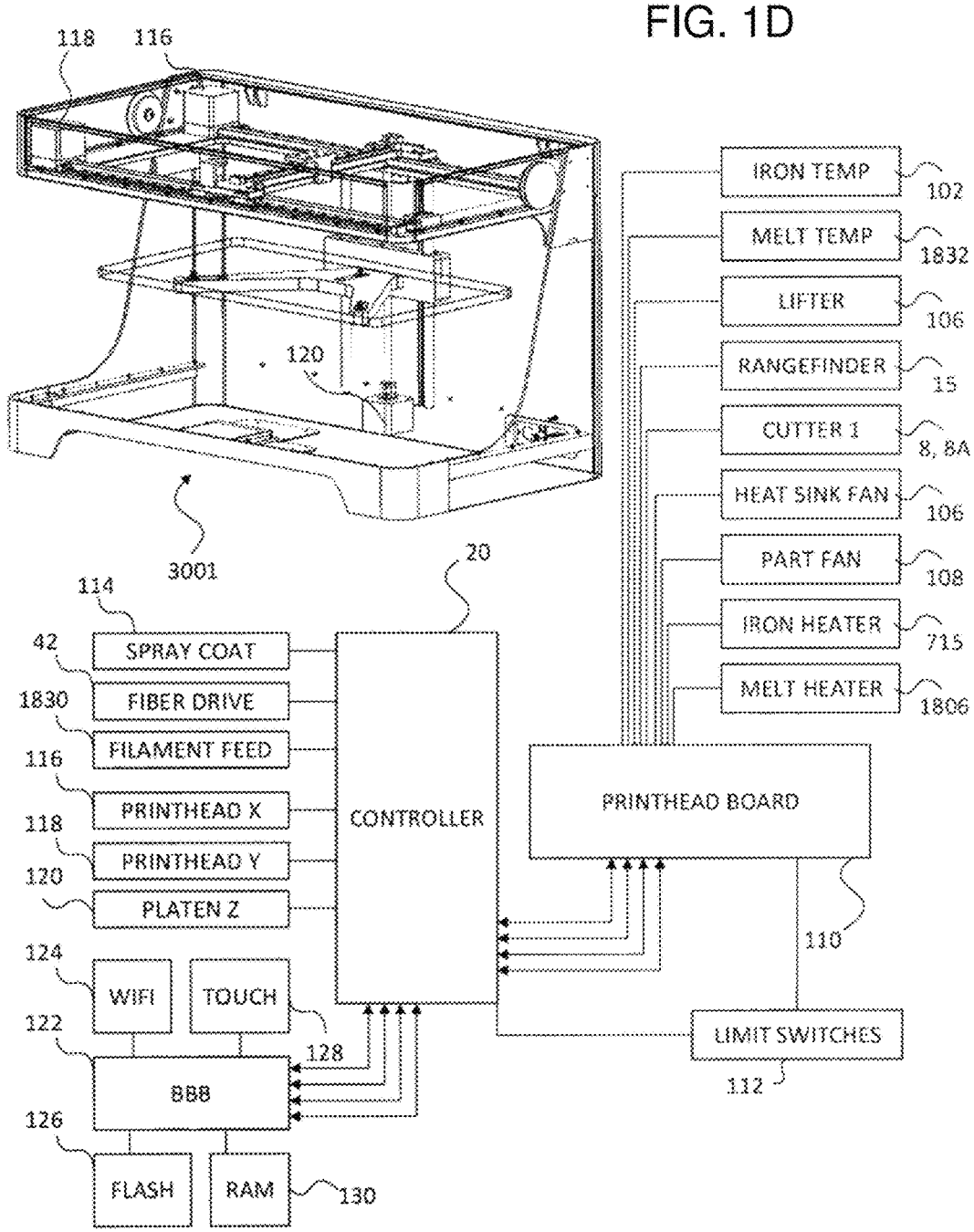
FIG. 1D is a block diagram and schematic representation of a three dimensional printer capable of printing with the compound extrusion and fiber printhead assembly of FIG. 1C.

Each of FIGS. 1A-1C may print with at least two print heads 18, 10 or printing techniques. One print head applies a fiber reinforced composite filament, and one print head applies pure or neat matrix resin 18a (thermoplastic or curing). The fiber reinforced composite filament 2 (also referred to herein as continuous core reinforced filament) may be substantially void free and include a polymer or resin that coats or impregnates an internal continuous single core or multistrand core. "Fill material print head" as used herein includes an optical curing or sintering devices for fill material.

The fiber reinforced composite filament 2, 2a is fed, dragged, and/or pulled through a conduit nozzle 10 heated to a controlled environment selected for the matrix material to maintain a predetermined viscosity, force of adhesion of bonded ranks, melting properties, and/or surface finish. For thermoplastic matrix 4, this may be a heated environment. For a curable matrix 4, this may be a neutral environment which does not initiate curing. In each case the matrix would be substantially freely flowing at the point of deposition.

The continuous core reinforced filament 2 is applied onto a build platen 16 to build successive layers 14 to form a three dimensional structure. The relative position and/or orientation of the build platen 16 and conduit nozzle 10 are controlled by a controller 20 to deposit the continuous core reinforced filament 2 in the desired location and direction.

A cutter 8 controlled by the controller 20 may cut the continuous core reinforced filament during the deposition process in order to (i) form separate features and components on the structure as well as (ii) control the directionality or anisotropy of the deposited material and/or bonded ranks and/or composite swaths in multiple sections and layers. At least one secondary print head 18 may print fill material 18a to form walls, infill, protective coatings, and/or dissolvable, peelable or otherwise removable support material.

The supplied filament includes at least one axial fiber strand 6, 6a extending within a matrix material 4, 4a of the filament, for example a nylon matrix 4a that impregnates hundreds or thousands of continuous carbon, aramid, glass, basalt, or UHMWPE fiber strands 6a. The fiber strand material preferably has an ultimate tensile strength of greater than 300 MPa.

The driven roller set 42, 40 pushes the unmelted filament 2 along a clearance fit zone that prevents buckling of filament 2. In a threading stage, the melted matrix material 6a and the axial fiber strands 4a of the filament 2 are pressed into the footwear component 14 and/or swaths below 2d, at times with axial compression. As the build platen 16 and print head(s) are translated with respect to one another, the end of the filament 2 contacts the ironing lip 726 and is subsequently continually ironed in a transverse pressure zone 3040 to form bonded ranks or composite swaths in the footwear component 14.

The feed rate (the tangential or linear speed of the drive 42, 40) and/or printing rate (e.g., the relative linear speed of the platen/footwear component and print head) may be monitored or controlled to maintain compression, neutral tension, or positive tension within the unsupported zone as well as primarily via axial compressive or tensile force within fiber strand(s) 6a extending along the filament 2.

As shown in FIG. 1C, a transverse pressure zone 3040 includes an ironing lip 726 that reshapes the filament 2. This ironing lip 726 compacts or presses the filament 2 into the footwear component and may also melt, heat to cross glass transition into a non-glassy state, and/or liquefy or maintain a liquefied state of the matrix material 4a in the transverse pressure zone 3040. Optionally, the ironing lip 726 in the transverse pressure zone 3040 flattens the melted filament 2 on the "top" side (i.e., the side opposite the footwear component 14), applying an ironing force to the melted matrix material 4a and the axial fiber strands 6a as the filament 2 is deposited in bonded ranks or composite swaths 2c. For example, the controller 20 maintains the height of the bottom of the ironing lip 726 to the top of the layer below as less than the diameter of the filament (e.g., to compress to ½ the height of the filament, at least at ½ the filament height; to compress to ⅓ the height of the filament, at least at ⅓ the filament height, and so on). The controller 20 may maintain the height at of the bottom of the ironing lip 726 to the layer below at zero (e.g., in which case the amount of consolidation/compression and the fiber swath 2c height may be a function of system stiffness). Another reshaping force is applied as a normal reaction force from the platen 16 or footwear component 14 itself, which flattens the bonded ranks or composite swaths 2c on at least two sides as the melted matrix material 4a and the axial fiber strands 6a are ironed to form laterally and vertically bonded ranks (i.e., the ironing also forces the bonded ranks 2c into adjacent ranks). As shown in FIG. 1C, if the underlying layer or swaths 2d includes channels, the normal reaction force from the footwear component 14 may create T-shapes instead. The pressure and heat applied by ironing improves diffusion and fiber penetration into neighboring ranks or swaths (laterally and vertically).

Unmelted fiber reinforced filament may be cut in a gap between a guide tube (having a clearance fit) and the conduit nozzle 708; or within the conduit nozzle 708, e.g., upstream of the non-contact zone 3030; and/or at the clearance fit zone 3010, 3020 or the ironing lip 725.

After the matrix material 6a is melted by the ironing lip or tip 726, the feed and/or printing rate can be controlled by the controller 20 to maintain neutral to positive tension in the composite filament 2 between the ironing lip 726 and the footwear component 14 primarily via tensile force within the fiber strands 4a extending along the filament 2. A substantially constant cross sectional area of the fiber reinforced composite filament is maintained in the clearance fit zone, the unsupported zone, the transverse pressure zone, and also as a bonded rank is attached to the workpiece or footwear component 14.

FIG. 1B depicts a cross section of a compound (e.g., at least dual) print head with an extrusion printhead 1800 and extrusion nozzle 1802 for FFF and a fiber deposition printhead 199 and conduit nozzle 708 for continuous fiber reinforced thermoplastic deposition. Like numbered features are similar to those described with respect to FIG. 1A.

With reference to FIG. 1B, each of the printheads 1800 and 199 are mounted on the same linear guide such that the X, Y motorized mechanism of the printer moves them in unison. As shown, the FFF printhead 1800 includes an extrusion nozzle 1802 with melt zone or melt reservoir 1804, a heater 1806, a high thermal gradient zone 1808 formed by a thermal resistor or spacer 1809 (optionally an air gap), and a Teflon or PTFE tube 1811. A 1.75-1.8 mm or 3 mm thermoplastic filament is driven through, e.g., direct drive or a Bowden tube provides extrusion back pressure in the melt reservoir 1804.

The companion continuous fiber embedded filament printhead 199, as shown, includes the conduit nozzle 708, the composite ironing tip 728, and the limited contact cavity 714, in this example each within a heating block heated by a heater 715. A cold feed zone 712 is formed within a receiving tube 64, including a capillary-like receiving tube of rigid material and a small diameter (e.g. inner diameter of 32 thou) Teflon/PTFE tube extending into the nozzle 708. The cold feed zone is surrounded in this case by an insulating block 66a and a heat sink 66b, but these are fully optional. In operation, an unattached terminal end of the fiber-embedded filament may be held in the cold feed zone, e.g., at height P1. Distance P1, as well as cutter-to-tip distance R1, are retained in a database for permitting the controller 20 to thread and advance the fiber-embedded filament as discussed herein. Further as shown, the controller 20 is operatively connected to the cutter 8, 8A, and feed rollers 42 facing idle rollers 40.

FIG. 1C shows a schematic close-up cross section of the conduit nozzle 708. As shown in FIG. 1C, and depicted essentially proportionately, the inner diameter of the receiving tube 64 (in this case, at a position where a Teflon/PTFE inner tube forms the inner diameter) may be approximately 1½ to 2½ times (at, e.g., 32 thou) the diameter of the filament 2 (at, e.g., 12-15, or 13 thou) shown therewithin. The inner diameter or inner width of the terminal cavity 714 (at, e.g., 40 thou) is from two to six times the diameter of the filament 2 shown therein. These are preferred ranges, it is considered the diameter of the receiving tube may be from 1$\frac{1}{10}$ to 3 times the diameter of the filament, and the inner diameter of the terminal cavity from two to 12 times the diameter of the filament. The terminal cavity is preferably of larger diameter than the receiving tube.

In addition, as shown essentially proportionately in FIG. 1C, the heated composite filament ironing tip 726 is moved relative to the part, at a height above the footwear component of less than the filament diameter and scaled according to a desired proportion of composite swath, to iron the fiber reinforced composite filament 2 as it is deposited to reshape a substantially oval or circular bundle of inelastic axial fiber strands 6a within the fiber reinforced composite filament to a substantially flattened block of inelastic fibers strands within a bonded rank 2c of the part. Axial compression and/or laterally pressing the melted matrix filament 2 into bonded ranks may enhance final footwear component properties. For example, FIG. 1C shows a composite fiber reinforced filament 2 applied with a compaction force, axial compression, or lateral pressure 62. The compaction pressure from axial compression and flattening from the ironing lip, compresses or reshapes the substantially circular cross-section filament 2a into the preceding layer below and into a second, substantially rectangular cross-section compacted shape 2c. The entire filament 2a forms a bonded rank 2c (i.e., bonded to the layer below 2d and previous ranks on the same layer) as it is shaped.

The interior strands 6a of the filament 2c both spread and intrude into adjacent bonded ranks 2c or 2d on the same layer and the matrix material 4a and strands 6a are compressed into the underlying shaped filament or bonded rank of material 2d. This pressing, compaction, or diffusion of shaped filaments or bonded ranks 2c, 2d reduces the distance between reinforcing fibers, and increases the strength of the resultant footwear component (and replaces techniques achieved in composite lay-up using post-processing with pressure plates or vacuum bagging). Accordingly, in some embodiments or aspect of the invention discussed herein, the axial compression of the filament 2 and/or especially the physical pressing by the printer head 70, conduit nozzle or ironing lip 726 in zone 3040 may be used to apply a compression/compaction/consolidation pressure directly to the deposited material or bonded ranks or composite swaths 2c to force them to spread or compact or flatten into the ranks beside and/or below. Cross-sectional area is substantially or identically maintained.

Alternatively or in addition, pressure may be applied through a trailing pressure plate behind the print head; a full width pressure plate spanning the entire footwear component that applies compaction pressure to an entire layer at a time; and/or heat, pressure, or vacuum may be applied during printing, after each layer, or to the footwear component as a whole to reflow the resin in the layer and achieve the desired amount of compaction (forcing of walls together and reduction and elimination of voids) within the final part.

The controller 20 of the printer 1000, may, as described herein, supply a multi-strand core reinforced filament 2 including a flowable matrix material 4a and a plurality of substantially continuous reinforcing strands 6a. The strands are preferably of a material having an ultimate or tensile strength of greater than 300 MPa (e.g., see Materials table). The substantially continuous reinforcing strands 6a extend in a direction parallel to a length of the filament 2. The controller 20 of the printer 1000 controls the actuators and heaters to deposit a first consolidated composite swath 2c of a height less than ½ the width of the filament 2 in a first upper, insole, orthotic or and/sole reinforcement formation, e.g., including at least one straight path and at least one curved path. Curved paths include both (i) curves in which the corner radius is greater than 2 times the composite swath 2c width—as deposited—as well as, or the alternative (ii) sharp corners, as unfolded or folded corners, having a corner radius from 0 to twice the composite swath 2c width. The controller 20 of the printer 1000 controls the actuators and heaters to flow the matrix material 4a and applying an ironing force that spreads the reinforcing strands 6a within the filament 2a against a deposition surface 16, 14, or 2d (once spread, the material may be considered a bonded rank or consolidated swath 2c).

Figure 2A:
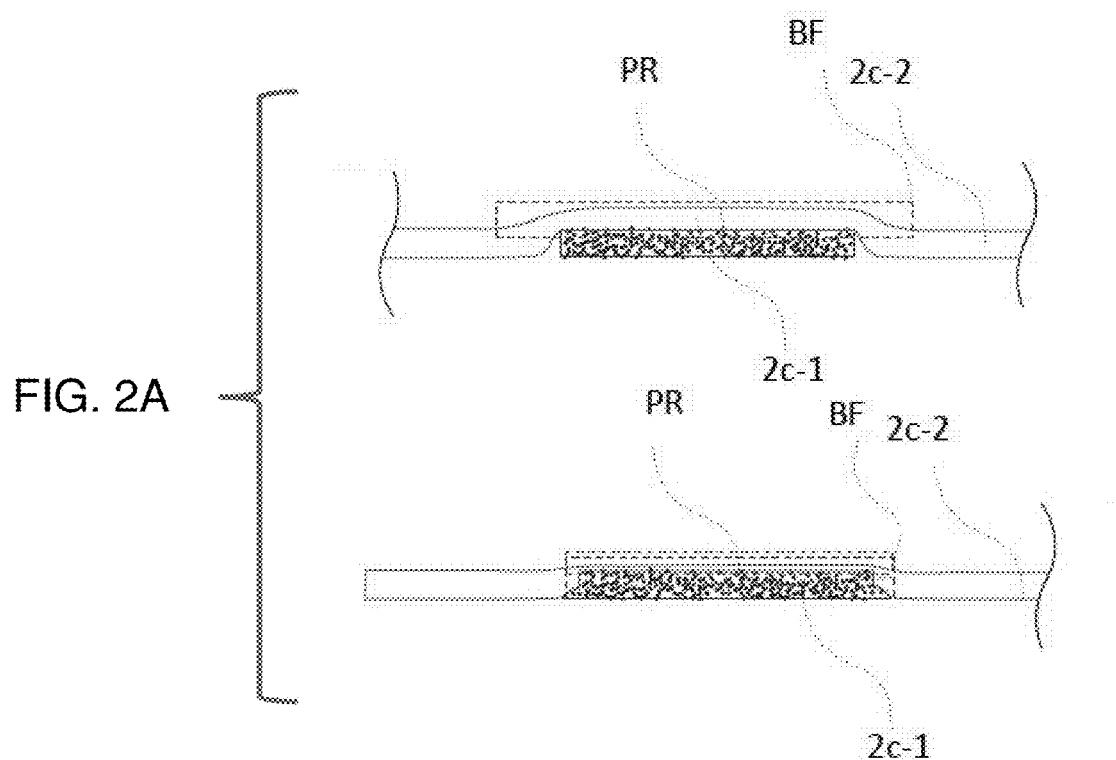
FIG. 2A shows crossing points of two fiber swaths in this case showing buffer zoned recorded in a database.

With reference to FIGS. 1C and 2A, the controller 20 of the printer 1000 controls the actuators and heaters to deposit a second consolidated composite swath 2c, also of a height less than ½ the width of the filament, in a second upper, insole, orthotic or and/sole reinforcement formation including at least one straight path and at least one curved path, by flowing the matrix material 4a and applying an ironing force to spread the reinforcing strands 6a within the filament 2 and/or second consolidated swath 2c-2 against the first consolidated composite swath 2c.

In some techniques disclosed herein, the controller 20 of the printer 1000 controls the actuators and heaters to deposit a first consolidated composite swath 2c-1 and the second consolidated composite swath 2c-2 as a continuous composite swath 2c within a single shell or layer of an additive manufacturing process. In alternative or additions to these techniques, the controller 20 of the printer 1000 controls the actuators and heaters to deposit the second consolidated composite swath 2c-2 with less ironing force than the first consolidated composite swath 2c-2, and/or deposit the second consolidated composite swath 2c-2 at a nozzle height from the first consolidated composite swath 2c-2 that is different from a previously deposited layer height.

In particular additions or alternative to these techniques, the controller 20 of the printer 1000 controls the actuators and heaters to deposit fill material 18a horizontally about the common overlap PR of the first consolidated composite swath 2c-1 and the second consolidated composite swath 2c-2 at a width of $\frac{1}{10}$ to 2 times the width 2c-1$_w$ of the first consolidated composite swath 2c-1. The linear speed at which the second consolidated composite swath 2c-2 is ironed against the first consolidated composite swath 2c-2 is optionally ¹⁄₁₀ to ⁹⁄₁₀ the linear speed at which the first consolidated composite swath 2c-1 was deposited; and/or the linear filament feeding rate at which the filament 2 for the second consolidated composite swath 2c-2 is supplied is greater than the linear printing speed at which the second consolidated composite swath 2c-2 is ironed against the first consolidated composite swath 2c-1 by 1 to 20%.

In other additions or alternative to these techniques, the controller 20 of the printer 1000 controls the actuators and heaters to maintain a tension along the composite swath 2c at which the first consolidated composite swath 2c-1 is deposited to be reduced at a location at which the second consolidated composite swath 2c-2 is ironed against the first consolidated composite swath 2c-1. In further alternatives or additions, the second consolidated composite swath 2c is deposited by the controller 20/printer 1000 in a second upper, insole, orthotic or and/sole reinforcement formation that extends substantially parallel to a first upper, insole, orthotic or and/sole reinforcement formation, wherein composite swaths 2c of the second upper, insole, orthotic or and/sole reinforcement formation are deposited at a second pitch substantially the same as a first pitch of the first upper, insole, orthotic or and/sole reinforcement formation and displaced by a distance of substantially half the first pitch.

Yet further alternative or additionally, the controller 20 of the printer 1000 controls the actuators and heaters such that the first consolidated composite swath 2c and second consolidated composite swath 2c are deposited in a location adjacent to and reinforcing a negative subcontour, such as a lace aperture, through-hole, or cut-away. In this case, "reinforcing" means following or tracing along a perimeter, wall, load line, stress concentration, or a trajectory drawn between the same. "Adjacent" means immediately adjacent, and also alternatively separated by a small number (e.g., 1-5) of coating, smoothing or compliant neat material 18a walls, floors, or ceilings. A negative subcontour may be a hole, or an embedded material or object or set-aside for same, or a second object with surfaces intruding into the layer or a set-aside for the same, or an overmolding, or in some cases a touching loop surrounding a hole, embedded object (e.g., a sensor device), or intruding object. In this technique, alternatively or additionally the first consolidated composite swath 2c and second consolidated composite swath 2c may be deposited in respective (adjacent) first and second layers in locations adjacent to and reinforcing a negative subcontour extending through each of the respective first and second layers.

Still further alternative or additionally, the controller 20 of the printer 1000 may control the actuators and heaters such that depositing the first consolidated composite swath 2c and the second consolidated composite swath 2c as a continuous composite swath 2c spanning (e.g., via inter-layer continuous traverse) two shells or layers of an additive manufacturing process.

Still further alternative or additionally, the controller 20 of the printer 1000 may control the actuators and heaters such that the first consolidated composite swath 2c is deposited in a first upper, insole, orthotic or and/sole reinforcement formation that has a higher strength in tension between a first negative contour (or hole) and a second negative contour (or hole) than the second upper, insole, orthotic or and/sole reinforcement formation.

The secondary print head 18 prints fill material to form walls, infill, protective coatings, and/or support material on each layer, and as described herein, to smooth over protrusions into neighboring layers.

As discussed in the CFF patent applications, a preferred technique for depositing a core-reinforced filament to become a fused composite swath compresses a core reinforced filament exiting a conduit nozzle to form a flattened shape.

The flattened shape is of variable height-to-width proportion, e.g., in cross-section from 1:2 through about 1:12 proportion. Preferably, the height of a compressed composite swath 2c substantially corresponds to the fill material layer height in the same layer, so that neighboring composite swaths 2c in the vertical direction can be tightly packed, yet be built up as footwear component of the same or adjacent layers as the surrounding, complementary and/or interstitial fill material 18a.

Inter-layer interaction among composite swaths 2c and fill material 18a may be more involved than interlayer interaction among layers of fill material 18a. In most cases, the only requirement for adjacent layers of fill material 18a is that they are satisfactorily fused in the vertical direction to avoid delamination, and in most cases the fill material 18a is fused (melted, or cured) under ambient or room pressure.

However, in the case of vertically adjacent layers of composite swaths 2c (or even of composite swaths 2c neighboring fill material 18a in a vertical direction), more types and more complex interaction is required and/or enabled. The properties of a composite swath 2c, or especially a group of composite swaths 2c interacting with one another, may improve with significant compression (e.g., flattening to more than 1:4 proportion), and providing this compression in the footwear component 14 may require accommodation of vertical and horizontal effects of the additional compression. In addition, unlike homogenous fill material 18a, the overlapping or crossing of composite swaths 2c may provide advantageous anisotropy or advantageous internal geometry.

With respect to additional compression, overlapping, or crossing, at least the following effects may be addressed:

1) Ironing compression is not necessarily linear, and because embedded fiber remains solidified and incompressible, compressed fiber may extend above or below the layer height of the fill material 18a within the same layers as the composite swaths 2c as set.

2) Overlapping or crossing composite swaths 2c may create humps or ridges that may extend above the current layer height of the fill material 18a as set.

3) Overlapping or crossing composite swaths 2c-2, 2c-1 may cause a current or an underlying composite swath 2c-1 to widen (in which case air volume to receive the widening composite swath 2c-1 may be provided, modeled, marked, or calculated, and later filled with fill material 18a).

Note also that inter-layer effects may be of significantly lesser height than a layer height of the slicing process for the fiber reinforced material and the fill material, for example, an intrusion of ⅔-¹⁄₁₀₀ of the layer height. In those cases where the effect or intrusion is particularly small, e.g., ⅓-¹⁄₁₀₀ of a layer height, it is not preferable to reslice the solid model at a fraction of the fill material layer height, as this may increase the printing time by a similar proportion. However, the effects may be "buffered" by, e.g., routing composite swaths 2c-1, 2c-2 in a neighboring layer to route around an inter-layer interference, or depositing fill material 18a to level the layer height $LA_n$ above or below an inter-layer interference 2c-3.

Accordingly, the present disclosure contemplates different buffering operations of an additive manufacturing 3D printer 100 to permit inter-layer effects of fiber compression, stacking, overlapping, crossing, and runout (e.g., different versions of composite swath 2c avoidance routing; different versions of composite swath 2c overprinting or fill material 18a "topping off"; ameliorating patterns which distribute rather than group discontinuities, gaps, or stress concentrations). In topping off, the controller 20 of the printer 1800 controls the actuators and the heaters to deposit at least one cover of fill material 18a (a material compatible with the matrix material 4a) or multi-strand core reinforced filament s in a layer adjacent the location at which the ironing force spreads the reinforcing strands 6a of the second consolidated composite swath 2c-2 against the first consolidated composite swath 2c-1, the cover having a thickness of less than the height of the layer.

In addition, the present disclosure contemplates that composite swath 2c routing and fill material 18a routing (i.e., toolpath generation) may generate data structures for keeping track of locations of inter-layer effects. One example data structure is an inter-layer interference map stored as a special set of zero-height contours (i.e., a zero-height phantom layer to which a layer above and below may refer during toolpathing operations). Contours may be stored in the interference map indicating the predicted effect in a layer above or below.

In depositing core reinforced filament as described in the CFF set of patent applications, the embedded strands 6a—unmelted carbon fiber, aramid, fiberglass, basalt or the like—are effectively incompressible and solid and cannot be as readily displaced as the heated and highly viscous fluidized thermoplastic 18a of FFF/FDM printing or fluid photopolymers. The present disclosure details inventions, embodiments, and implementations of techniques for intra-layer and inter-layer crossing of core reinforced filament as applied in additive manufacturing in the CFF set of patent applications, A core-reinforced multi-strand composite filament 2 may be supplied, for example, as a circular to oval cross section, and/or of approximately ⅓ mm in diameter and/or "13 thou" diameter.

As shown in Table 1 below, a circular cross-section filament 2 compressed during deposition becomes a progressively wider composite swath 2c. The table uses an example dimensionless diameter of 3 units for "round numbers".

As shown in the table, for any size of substantially circular cross section core reinforced filament 2, flattening to about ⅓ of its diameter becomes about 2.2-2.5 times as wide as its original diameter, and if flattened to about ½ its diameter becomes about 1.4-1.7 times its original diameter.

TABLE 1

| Example Diameter (Circle): 3 units Rectangle Compression | | | Approximate Area: 7 units^2 T-Shape or L-Shape Compression | |
|---|---|---|---|---|
| | H | W | H | W |
| ⅔ D height | ~2 | ~3½ | ⅔ D height | 2 | 4.7 |
| ½ D height | ~1½ | ~4½ | ½ D height | 1.5 | 6.3 |
| ⅓ D height | ~1 | ~7 | ⅓ D height | 1 | 9.5 |
| ¼ D height | ~¾ | ~9½ | ¼ D height | 0.75 | 12.5 |

For example, to complement an additive manufacturing layer height of 0.1 mm, a ⅓ mm diameter core reinforced filament 2 may be flattened to a composite swath 2c of roughly rectangular shape of proportion 1:6 through 1:12 (herein "highly compressed"), e.g., about 0.7-1.1 mm wide by about 0.07-0.12 mm high. One preferred ratio is roughly 1:9. Even higher compression may be possible, e.g., 1:12 to 1:20, but may demand significant system stiffness in the printer 100.

In contrast, to complement an additive manufacturing layer height of 0.2 mm, a ⅓ mm diameter core reinforced filament 2 may be flattened to a composite swath 2c of roughly rectangular shape of proportion 1:1.5 to 1:4 (herein "lightly compressed"), e.g., about a roughly rectangular shape of about 0.4-0.6 mm wide by about 0.2 mm high.

However, a fiber-embedded rectangular cross section of 1:1.5 to 1:3 is not as compressed or consolidated as one of 1:6 to 1.12 proportion, and in many cases, an relatively higher amount of consolidation is preferable to reduce voids and improve mingling of fibers in adjacent ranks 2c-2c or 2c-2d.

It should be noted that a supplied fiber reinforced filament 2 may have a constant cross-sectional area as supplied and as deposited (unless coextruded or supplemented); while a supplied FFF filament 18a has both a very different cross-sectional area as supplied and as deposited (having a much larger diameter as supplied), as well as variable cross-sectional area as deposited (having a bead size depending on extrusion rate). Given that a highly compressed composite swath is preferable to a lightly compressed one, combining a larger FFF extrusion rate layer height (e.g., 0.3 mm) with a highly compressed composite swath (e.g., 1:9 ratio) may be challenging. Accordingly, when a fill material height is such that the amount of compression is unacceptably reduced, more than one layer of fiber may be arranged per layer of fill material (e.g., 2 or 3 1:9 sublayers of 0.1 mm composite swath 2c per one respective 0.2 or 0.3 mm layer of fill material 118a). In this case, most or all fill material 18a is deposited after the composite swaths 2c; although in an alternative mode self-collision detection may be used to avoid contacting the nozzles to the footwear component and the order of deposition thereby varied. In addition, in a modification of this process, the fill material height and compression amount may be selected to match stacks of 1:6-1:12 "highly compressed" composite swaths 2c (e.g., for a fiber of ⅓ mm diameter, the matching fill material 18a layer height capped at approximately 0.24 mm, because the highest acceptable "highly compressed" stack of two fibers is 1:6 ratio×2, or 0.12 mm×2).

As shown in FIG. 1C, another possible compressed shape is a T or L shape, with the "long" side being the top surface directly compressed.

It should be noted that the cross-sectional representation of reinforcing strands 4a within filament 2a and deposited swaths 2c are schematic only. In most cases, the reinforcing strands are in the hundreds to thousands of parallel strands within the filament 2a or swaths 2c.

Continuous carbon fiber composite laminates may be formed up in a "quasi-isotropic" (QI) four-ply construction at 0, +/−45 degrees, and 90 degrees (or other 4 ply orientation code). Anisotropically biased layups (e.g., 0, +/−30 degrees, 90 degrees) are also used. The laminae may be cut at the row ends or the rows may turn within the layer at row ends. The reinforcement formations discussed herein for 3D printed composite swaths 2c may optionally be used in combination with QI construction. Quasi-isotropic laminates may have substantially isotropic properties in-plane, e.g., or may have an extensional stiffness matrix that behaves substantially as does an isotropic material. A substantially quasi-isotropic laminate may have either randomly oriented fiber in all directions, or has fibers oriented such that substantially equal strength is developed all around the plane of the part. Generally, a quasi-isotropic laminate may have unidirectional plies (e.g., 3D printed layers) oriented at 0°, 90°+45° and −45°, with at an exemplary 12.5% of the plies in each of these four directions. Quasi-isotropic properties can also be achieved with 0°, 60° and 120° oriented unidirectional plies as well.

FDM or FFF layers may be formed in orthogonal layers at +/−45 degrees of alternating raster formation. Generally raster formation is preferred in order to extrude hot, flowing plastic next to still-warm extrudate from the immediately previous row to improve bonding, with only minor consideration for directional strength. The +/−45 degree raster formation gives a multi-directional and satisfactory workable middle range of tensile strength, +/−25% from the best and worst rastering patterns (e.g., 20 MPa UTS for ABS in 45-45 pattern, vs. about +5 MPa for longitudinal raster and about—5 MPa for transverse or diagonal raster). Note also that the better rastering patterns per load direction, which may place the direction of most of the extrudate roads in the same direction as the load, may approach injection molding strength (e.g., about 95% of injection molding).

In 3D printing in a stranded-filament-to-ironed swath $2c$ technique, both negative and positive contours may be reinforced beyond the matrix or fill material strength with continuous composite swaths looping about the contour without severing the fiber. This in-plane looping is impossible with composite layup, which cannot make turns within the plane without breaking the materials; and of different character and limited effect with extrudate.

In the case of one, two, or more holes, lace apertures, airflow holes, negative contours, embedded contours, or overmolded contours in an actual footwear component, in many cases different kinds of reinforcement will be possible. For example:

(1) Reinforcement of inner walls and hole walls may closely follow the walls, with or without layers of fill material shielding the innermost wall to prevent print-through of fiber, e.g., Fig. "Holes" include negative contours and embedded (e.g., overmolded) contours.
(2) Reinforcement of outer walls may closely follow the walls, with or without layers of fill material shielding the innermost wall to prevent print-through of fiber, e.g., "outer" reinforcement formations.
(3) Reinforcement may extend along load lines or stress lines, e.g., outer reinforcement formation.
(4) Reinforcement for tension load purposes may include multiple straight composite swaths between the sites at which the tension load is supported.
(5) Reinforcement for torsion, torque, or pressure load purposes may include multiple circular composite swaths along directions of hoop stresses.
(6) Reinforcement for compression load purposes may include multiple neighboring composite swaths to provide low aspect ratio cross sections and/or squat structures, and/or anchors at ½, ⅓ fractional, e.g. harmonic lengths to guard vs. buckling; and/or e.g., more composite swaths for compression struts than for tension struts.
(7) Reinforcement for twisting may include angular cross bracing in triangle or X shapes.
(8) Reinforcement for bending or combination load purposes may include embedded high moment of inertia (cross section) structures such as sandwich panels, tubes, boxes, I-beams, and/or trusses formed from embedded composite swaths. These may be made in layers spaced from the centroid of the footwear component cross section, or in outer toolpaths spaced from the centroid of the footwear component cross section, depending on the load and the orientation of the footwear component during printing.

In general, it is preferable to apply strategies in which compression and/or layer height interference of an overlapping or crossing layer (e.g., which may correspond in part to layer height) may be set to deposit two highly compressed layers of composite swaths $2c$-$2$, $2c$-$1$, and to square up corresponding fill material $18a$ at a height of close to twice the highly compressed composite swath height. It may also be preferable to permit or create crossings of toolpaths of composite swaths $2c$-$1$, $2c$-$2$, and to square up corresponding fill material $18a$ at a height of close to twice the highly compressed composite swath height. Crossings of highly compressed composite swaths with one another, and/or crossings of highly compressed composite swaths with lightly compressed composite swaths may be used. As shown in the CFF patent applications, toolpaths for deposition of core reinforced fiber may be generated within contours and sub-contours, and in order to maintain parallel paths, and often follow offsets of the contours and sub-contours.

It should be noted that only some toolpaths, composite swaths $2c$, and/or multi-swath fiber tracks form "loops", closed "loops", or "crossing turns" as continuously deposited in a single layer of an additive manufacturing process.

FIGS. 2B-2F show three examples of crossing turns, i.e., loops or crossed loops that are made about internal geometry, such as a hole within a layer (a hole represented as a negative contour); and FIGS. 2B-2C show two examples that may be crossing turns but could also be distributed between two layers. Each represented crossing turn may depict either a single composite swath, or a multi-swath track of parallel composite swaths. "Track" in this context means closely arranged (often touching), and often parallel swaths, which may be printed concentrically, spirally, or in parallel. A track need not have all swaths parallel throughout its entire length. The followed hole H0 is in each case circular, but may be any shape having a perimeter that can be followed by a toolpath (e.g., hexagonal or square). In FIGS. 2B-2F, single layer or double layer overlaps (i.e., locations where a swath or multi-swath track is directly over an underlying swath or multi-swath track within the same printing layer) are depicted as darker shade and single swaths or multi-swath tracks as comparatively lighter shade/transparency). In several cases, parallel or neighboring entering and exiting swaths or multi-swath tracks are depicted as cleanly separated and cleanly on either side of the center line, but may overlap and/or cross a center line.

Crossing points made in a same layer, which may be one continuous composite swath or different composite swaths, may be referred to as "intra-layer" crossing points. Crossing points made between two layers, which in most cases may be different continuous composite swaths are referred to as "inter-layer" crossing points. It should be noted that a raster pattern crossed with another raster pattern on another layer produces a dense array of inter-layer crossing points, but these crossing points do not particularly reinforce any neighboring feature or contour. As such, a single inter-layer crossing point (e.g., such as that in FIG. 2E or 2F) or a small group of inter-layer crossing points are herein discussed as "isolated crossing points". As discussed herein, intra-layer crossing points tend to create protrusions at the crossing point layers in the case of composite swaths, less so in the case of extruded fill material alone; while inter-layer crossing points do not create such protrusions unless otherwise described.

FIG. 2B shows a crossing turn made about a hole H0—such as a lace aperture, airflow aperture, mesh gap, through-hole, in upper, insole, sole, or orthotic—in which (i)

the swath or multi-swath track approaches the hole H0 approximately parallel to an (imaginary) line through its center, axis or centroid, (ii) crosses the line to an opposing side of the hole, (iii) closely follows the perimeter of the hole H0, (iv) crosses itself and the line, and (v) departs from the hole H0 approximately parallel to itself and the line. A diamond-shaped overlap PR13 is formed, which may extend above the height of a single swath 2c. A buffer-zone BF15 may be created or marked about the overlap. This type of crossing turn closely follows and reinforces a hole wall for greater than 300 degrees of arc, and may be the end loop of a larger pattern. It should be noted that the entering and exiting swaths 2c or multi-swath tracks are depicted as cleanly separated and cleanly on either side of the center line, but may overlap and/or cross the center line.

FIG. 2C shows a crossing turn made about a hole H0—such as a lace aperture, airflow aperture, mesh gap, through-hole, in upper, insole, sole, or orthotic—in which (i) the swath 2c or multi-swath track approaches the hole H0 approximately parallel to an (imaginary) line parallel to a tangent to a perimeter of the hole H0, (ii) crosses the line to follow a perimeter of the hole H0, (iii) closely follows the perimeter of the hole H0, (iv) crosses itself and (v) departs from the hole H0 approximately along the same line from which it approached, continuing the entry toolpath. A C-shaped overlap BF16 is formed, which may extend above the height of a single swath 2c. A buffer-zone BF16 may be created or marked about the overlap. This type of crossing turn closely follows and reinforces a hole wall for greater than 360 degrees of arc, and may be a middle loop in a larger pattern. It should be noted that the entering and exiting swaths 2c or multi-swath tracks are depicted as along the same line, but may be offset or exit at an angle to the approaching swath 2c or track. FIG. 2D shows a crossing turn similar to FIG. 2C, except that (i) the approaching swath 2c or multi-swath track is more offset from the (imaginary) tangent to the hole, and so turns slightly in an S-shape to approach the tangent at an angle, and similarly (v) departs from the hole H0 in a manner mirroring the entry. The C-shaped overlap PR15 and buffer zone BF17 may be of different or more concave shape.

FIGS. 2E and 2F show overlaps or crossing points adjacent a hole—such as a lace aperture, airflow aperture, mesh gap, through-hole, in upper, insole, sole, or orthotic—in which a bight, open loop or touching loop may be made away from the reinforced hole H0 from which the swath 2c or multi-swath track returns toward the hole H0 (e.g., one example of returning shown in FIG. 13E). A different swath 2c or multi-swath track within the same layer may also form the return path. In the case of FIG. 2E, (i) the swath 2c or multi-swath track approaches the hole H0 approximately parallel to an (imaginary) line through its center, axis or centroid, separated by approximately a track width, (ii) follows the perimeter of the hole H0, then (iii) crosses the line to an opposing side of the hole H0, and (iv) departs from the hole H0 approximately parallel to itself and the line. Upon returning from the pattern away from the hole H0, the swath 2c or multi-swath track (v) crosses itself and the line to an opposing side of the hole H0, (vi) closely follows the perimeter of the hole H0, and (vii) departs from the hole H0 approximately parallel to itself and the line, again separated by a swath or track width. A diamond-shaped overlap PR16, PR17 is formed, which may extend above the height of a single swath. A buffer-zone BF18, BF19 may be created or marked about the overlap PR16, PR17. This type of crossing point closely follows and reinforces a hole wall for 240 degrees of arc, and may be the end loop of a larger pattern.

Figure 7A:
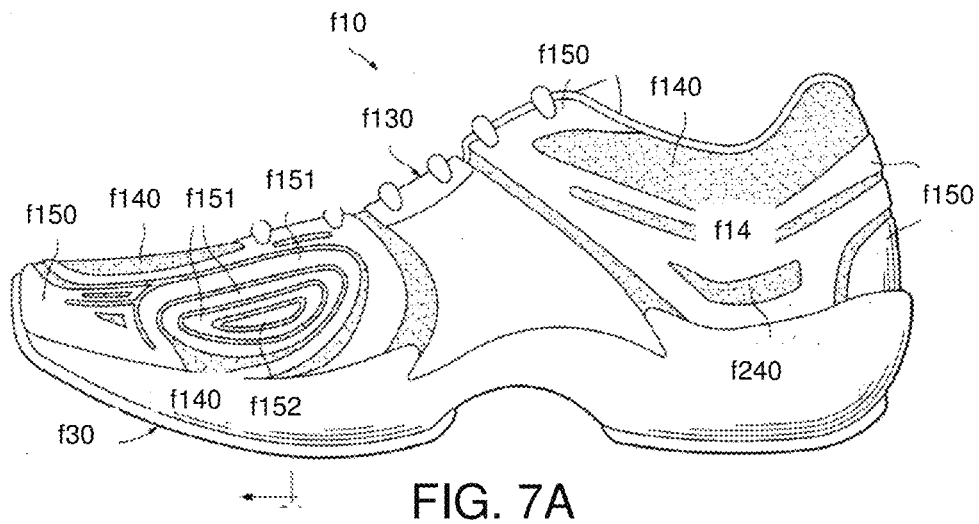
Figure 7B:
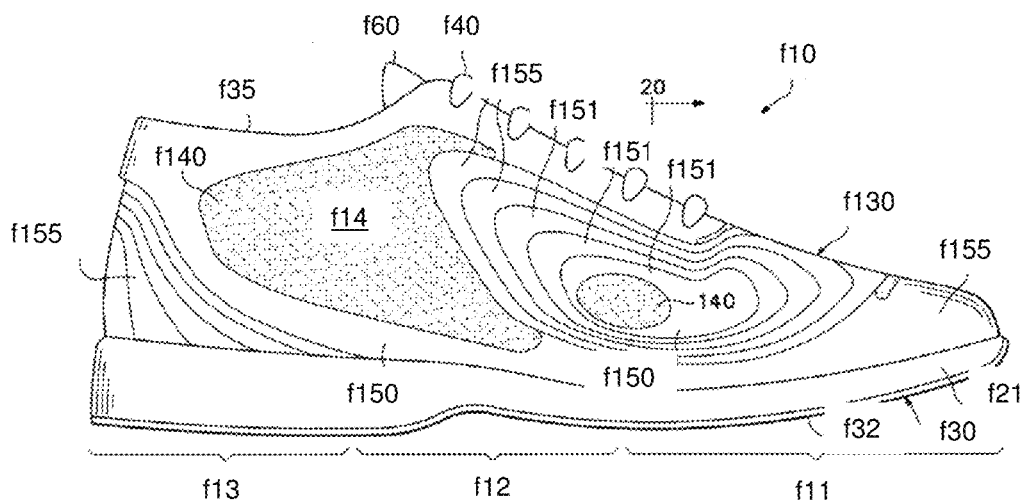
Figure 7C:
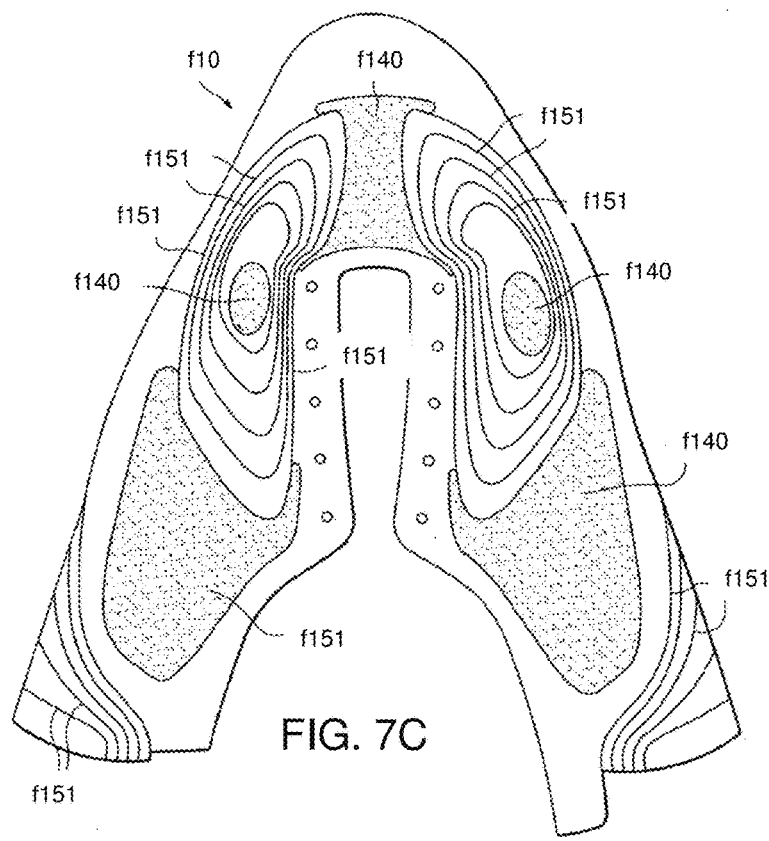
Figure 7D:
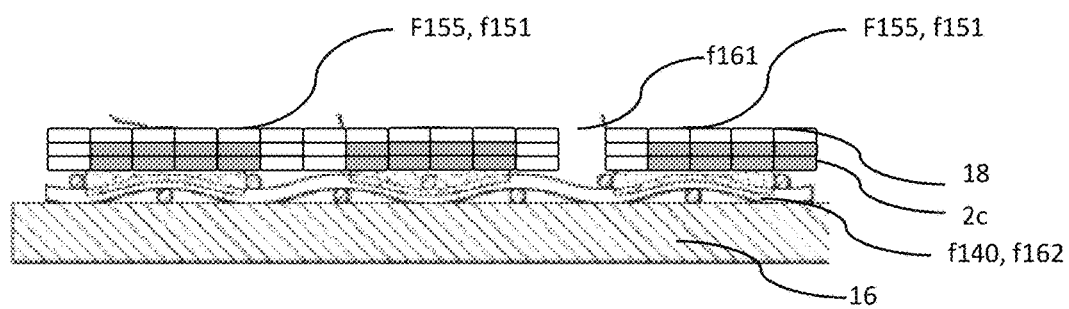
Figure 7E:
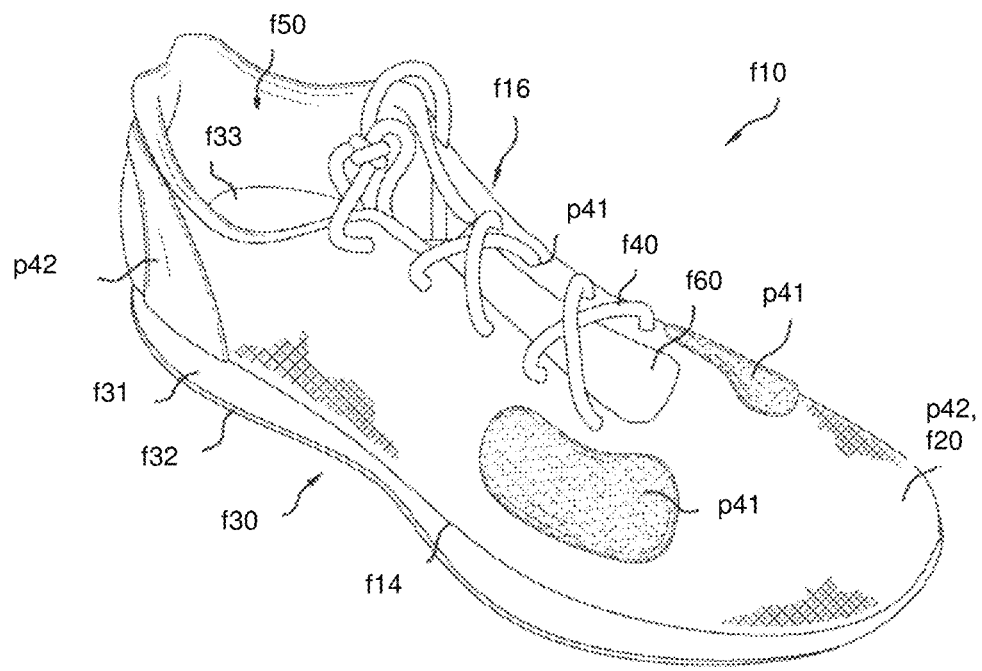

The crossing point of FIG. 7E may be complemented by a vertically mirrored version of itself in a complementary layer without stacking overlaps or buffer zones (as shown in FIG. 8E). The crossing point of FIG. 7D, in contrast, approaches the hole closer to the center line and crosses itself at both sides of the hole.

At least the following strategies are available for accommodating the protrusion PR in a footwear component 14 where successive layers are nominally of a consistent height—for example, 0.1 mm height. These strategies would in many cases be applied during slicing and toolpath or reinforcement formation planning for the footwear component 14, in part so that inter-layer accommodations may be made. Where the protrusion PR scale (e.g., height and/or width) is modeled/predicted/empirically known and stored as an absolute or relative value or a function of system variables, the overlap PR or a buffer zone BF larger than the overlap PR may be marked or planned in the current layer $LA_n$.

(1) Subsequent path planning in the same layer (layer $LA_n$) may:

(a) avoid crossing the overlap within the same layer (e.g., layer $LA_n$ by planning toolpaths which do not cross the overlap, although the new toolpaths may form a crossing point, jump, crossed loop or crossing turn forming a new overlap).

(b) plan new toolpaths within the same layer (layer $LA_n$) separated by more than the buffer zone.

Subsequent or integrated path planning for a new, adjacent layer ($LA_{n+1}$) adjacent to the layer in which protrusions are formed (layer $LA_n$) may:

(c) increase the previous layer height (of layer $LA_n$) in the overall slicing approach, and/or decrease the current layer height (of layer $LA_{n+1}$). This is most applicable when no composite swaths, or composite swaths which do not cross and create protrusions, will be formed in the current layer.

(d) path plan composite swaths to avoid overlaps and/or buffer zones in the layer below (layer $LA_n$);

(e) path plan a complementary or partner patterns in the current layer ($LA_{n+1}$) which provide complementary functionality to a pattern in an adjacent or previous layer (layer $LA_n$).

FIGS. 3A-3D show patch fills and concentric fills that may be used to fill in reinforcement regions as disclosed herein.

Figure 3A:
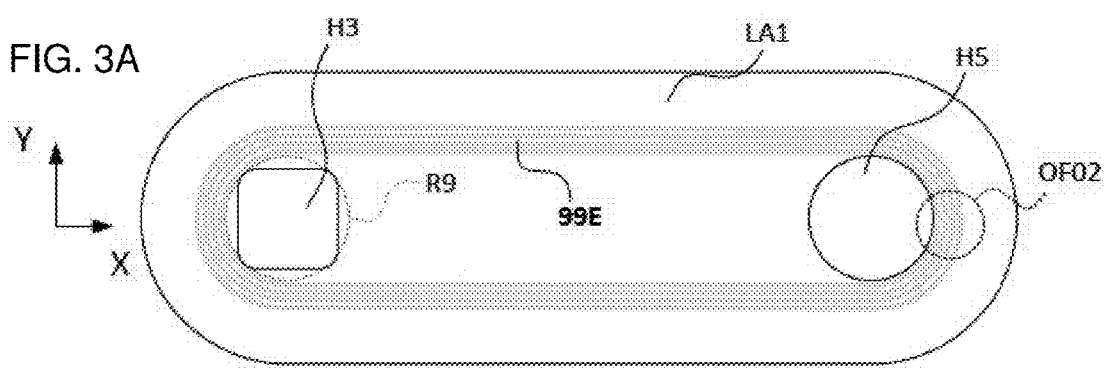
Figure 3B:
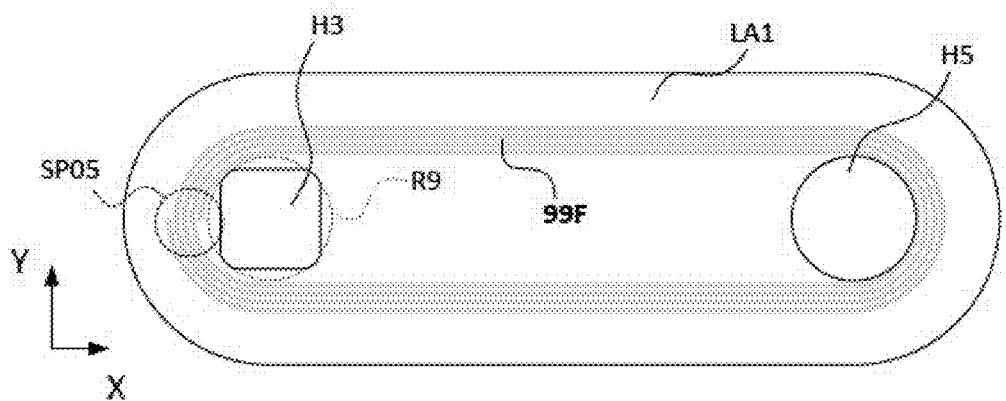

FIG. 3A shows a variation of FIG. 3B in which the toolpath, composite swath pattern, or reinforcement formation 99E is of offset approach, with crossovers OF02 at the opposite side of the footwear component from the spiral start and end of the spiral strategy toolpath of FIG. 3B. FIG. 3B shows a toolpath, composite swath strategy or reinforcement formation 99F, as a spiral strategy, excepting that FIG. 3B shows a paired square hole H2 and circular hole H5.

Figure 3C:
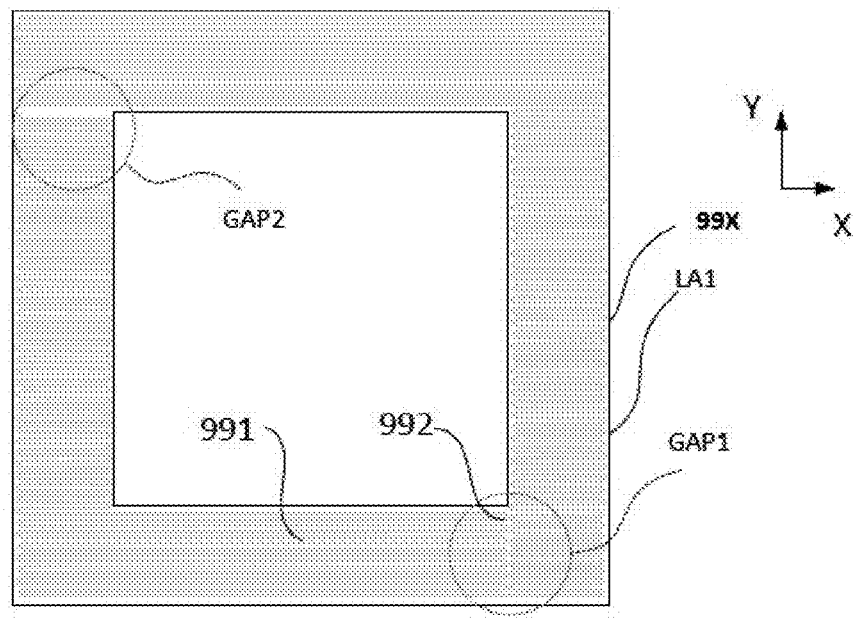
Figure 3D:
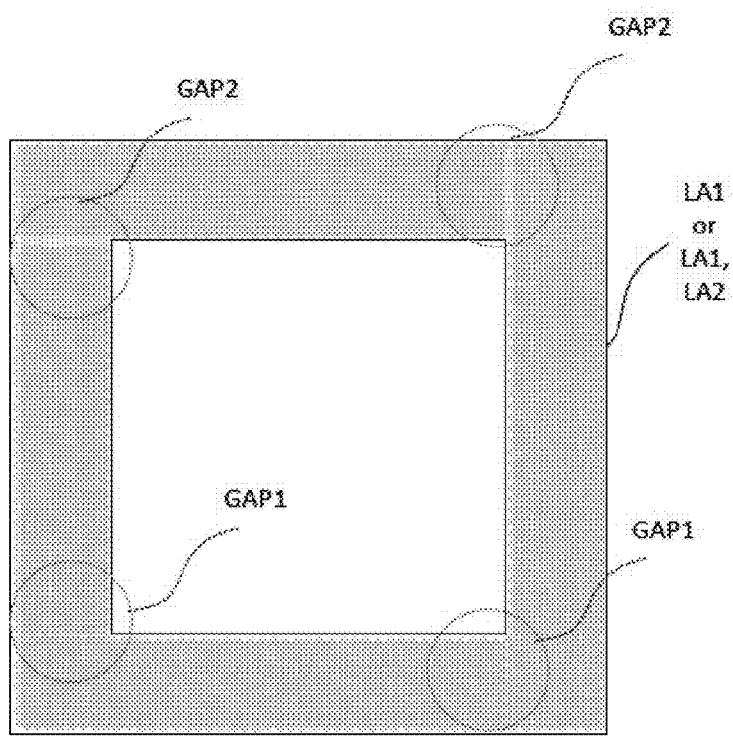

FIG. 3C shows a single layer of a densely filled square plate of four long side members, with an aperture, space for a stretchable substrate, hole or negative contour in the middle. In FIG. 3C, as shown, a lengthwise raster fill reinforcement formation 99X surrounds the contour or region in the middle. There are many turns in the raster pattern, and two gaps GAP1 and GAP2 (which may also be stress concentrations, starts, or stops are formed. GAP1 is formed where the pattern changes regional groups, and GAP 2 is formed at the end of the composite swath 2c. These gaps may also occur if the composite swath 2c length is not perfectly predicted or measured. Within the layer, the gaps may be filled with (i) fill material 18a, (ii) lengths of composite swath 2c which do not continue the raster fill (e.g., gap filling patterns, which may be concentric, wall or region following), (iii) and/or with overlapping composite swath 2c or protrusion PR. E.g. in order to fill the GAP1 or GAP2 in FIG. 10J with overlapping composite swath 2c, each raster pattern would be widened to overlap (e.g., FIG. 10L, wherein the gaps are closed with protrusions PR, which may be varied in position among layers as discussed herein). In FIG. 3D, two superimposed reinforcement formations 99X, 99X layers are shown, where the reinforcement formation 99X is rotated by 90 degrees, optionally in the subsequent layer. The reinforcement formation 99X may be rotated at 90 degrees, then again, in an additional two layers to continue to change the position of the gap, stress concentration, starts, or stops. Optionally, the pattern is rotated by 45 degrees in some intervening layers.

As depicted throughout the Figures, footwear f10 may be divided into three general regions: a forefoot region f11, a midfoot region f12, and a heel region f13, with lateral side and a medial side. The forefoot region f11 generally includes portions of footwear f10 corresponding with the toes and the joints connecting the metatarsals with the phalanges; the midfoot region f11 generally includes portions of footwear f10 corresponding with the arch area of the foot, and the heel region f13 corresponds with rear portions of the foot, including the calcaneus bone.

An upper f20 is often formed from a plurality of material elements (e.g., textiles, polymer sheet layers, foam layers, leather, synthetic leather) that are stitched or adhesively bonded together to form a void for receiving a foot; that forms a structure that extends over instep and toe areas of the foot, along medial and lateral sides of the foot, and around a heel area f13 of the foot; that may incorporate a lacing system f40-f41 to adjust fit of the footwear f10, as well as permitting entry and removal of the foot from the void within the upper f20; and may include a tongue f60 that extends under the lacing system f40-f41 to enhance adjustability and comfort of the footwear f10; and may incorporate a heel counter.

A sole structure f30 is secured to the upper f20 and extends between the foot and the ground when footwear f10 is worn. The sole structure f30 includes a midsole f31, an outsole f32, and/or a sockliner f33. The midsole f31 may secured to a lower surface of the upper f20, and may be formed from a compressible polymer foam element (e.g., a polyurethane or ethylvinylacetate foam), or incorporate fluid-filled chambers, plates, moderators, or other elements that further attenuate forces, enhance stability, or influence the motions of the foot. An outsole f32 is secured to a lower surface of the midsole f31 and may be formed from a wear-resistant rubber material that is textured to impart traction. A sockliner f33 may be located within the upper f20 and is positioned to extend under a lower surface of the foot.

Portions of the upper f20 may be formed from materials that are stitched or bonded together (e.g., textiles, polymer sheets, foam layers, leather, synthetic leather)) to form a void for receiving and securing a foot relative to the sole structure f30 via an ankle opening f50 located in the heel region f13. A lace f40 extends through various lace apertures f41 and permits the wearer to modify dimensions of the upper f20 to accommodate the proportions of the foot. The upper f20 may include other lace-receiving elements, such as loops, eyelets, and/or D-rings (as discussed herein, each of which may be formed from 3D printed continuous fiber swatch bights or loops, in single layers or multiple layers); a tongue f60 that extends between the interior void and lace f40; and/or a heel counter that limits heel movement in heel region f13; and/or a wear-resistant toe guard located in the forefoot region f11.

In some examples, the upper f20 or sole f30 may be formed using 3D printing. A first portion of the upper f20 may be formed of a first material (e.g., an underlying set of layers forming a substrate, formed by fill material and/or by patterns of continuous fiber) and a second portion of the upper f20 may be formed of a second material, different from the first material. The first and second portions may be formed in a same layer of 3D printing and/or in different layers. The first material and the second material may provide different mechanical characteristics to the different portions of the article of footwear. In some cases, as discussed herein, the first material may be a fill material formed from plastic or resin, and the second material may be a continuous fiber swath formed from a compatible plastic matrix and reinforcing fibers having an ultimate or tensile strength of greater than 300 MPa. In other cases, the first material may be a 3D printed structure including both plastic fill material and composite fiber reinforcement of a first fiber material (e.g., aramid fiber for impact resistance) and the second material may be a 3D printed structure including a same, similar or compatible plastic fill material and a second, different fiber reinforcement of a second fiber material (e.g., carbon fiber for high strength-to-weight ratio).

3D printing may provide reinforcement at areas that experience flexing or heavy wear or stress, to prolong the usable life of the article of footwear f10 by reinforcing the region prone to weakening, tearing, etc. For example, eyelets or lace apertures f40, f41 may be reinforced by 3D printing.

A toe region in the forefoot region f11 may also be considered a high wear region due to a wearer's toe pushing on the inner side of the toe region during use. Accordingly, a 3D printed regional reinforcement structure may be positioned in that region to aid in preventing holes, tearing, etc. For instance, the reinforcement may be thinner or sparser (e.g., fewer reinforcing fibers per unit volume or area) at the rear of the toe region (i.e., closer to the midfoot region f12 of the shoe) rather than at the front of the toe region to provide additional support at the front of the shoe.

The shape, size, thickness, etc. of a reinforcement may be customized for a particular wearer. That is, the gait or step cycle and characteristics of the wearer may be studied in order to determine where additional reinforcement may be needed and the reinforcement may be constructed accordingly. For persons that tend to over-pronate during their steps, additional stiffness and/or wear reinforcement may be provided in the lateral heel area of the sole f30.

Additionally or alternatively, the vamp forefoot region (e.g., a front section of a shoe's upper f20 covering the wearer's toes and part of the instep) includes a flex region that may also benefit from reinforcement. A vamp forefoot region reinforcement may be formed to permit flexing of the article of footwear in that region, while providing additional durability and wear resistance in the high stress area of the shoe (for example, when jumping, crouching, etc.).

A collar region (e.g., about the ankle) of the article of footwear f10 is often a region that receives heavy wear and may be likely to tear, wear down, etc. Accordingly, reinforcement in the collar region may prolong the usable life of the shoe.

Resin portions of the article of footwear may be formed using a thermoplastic, thermosetting, or photocuring elastomer. Reinforcing portions of the article of footwear may be formed using continuous, long random or chopped, or short random or chopped fiber reinforcement.

FIGS. 4A-4K show exemplary insole or sole f30 components (inserts, and/or integral sole components) that may be manufactured with one or more reinforcing core reinforced filaments having a matrix material impregnating reinforcing strands aligned along the filament, as well as a fill material separate from the core reinforced filament, as described with reference to FIGS. 1A-2F.

Different shapes of insoles, sole plates, gait plates, or orthoses as depicted in FIGS. 4A-4K may be built up from standard or customized forms, to address significant medical issues or minor aberrations in gait or stride.

Without the use of fiber reinforcement or as a complement to fiber reinforcement, at least the following techniques may be used to influence gait or stance or relieve pain or pressure:

(i) subtractions or additions in height in different regions
(ii) increase or decreasing density of a single material in different regions
(iii) using higher or lower stiffness or elasticity materials in different regions.

Fiber reinforcement may improve control over the properties of the footwear in each of these areas, and adds new control.

Fiber reinforcement can increase stiffness in a localized area of any arbitrary shape. Stiffness can be increased with a stiff fiber; with more fiber per layer; or by depositing fiber towards the outside of a bending member to increase the moment of inertia and sandwich panel behavior (e.g., quasi-isotropic or QI panel structures of appropriate or different orientation code).

Fiber reinforcement can also provide anisotropic or directional stiffness in a localized area of any arbitrary shape. For unidirectional plies or layers, stiffness and/or strength will be higher along the direction of the fiber swaths, and lower in the direction transverse the fiber swaths. Anisotropic orientation codes of laminates may be employed to assemble plies to concentrate strength or stiffness in a general direction.

These factors can be applied in a base shape of an insole, gait plate, sole plate, or orthotic, or in an addition or added protuberance to the base shape as in (i), (ii), or (iii).

Using the term "insole" generically to apply to an insole, orthotic, gait plate, or the like (i.e., an insert or insole OI inserted into footwear f10), according to the embodiments of a method of 3D printing for reinforcing a footwear insole OI, at least one layer of fill material may be deposited in a footwear insole OI shape as a printing substrate upon a print bed, or an insole OI blank (e.g., of fabric, polymer, or organic material) may be provided as the footwear f10 insole OI shape. Alternatively, the footwear f10 insole OI shape may be formed by dissolvable, peelable, or otherwise removable support structure. The footwear insole OI shape preferably has a flat upper surface for 3D printing. As discussed herein, an insole OI may sometimes be described similarly to a sole f30 (e.g., with forefoot region f11, midfoot region f12, and heel region f13; or, e.g., with only midfoot region f12 and heel region f13 for orthotics or inserts OI of less than full length).

Core reinforced filament may be deposited to fuse to the footwear insole shape in at least one region of anisotropic fiber stiffness. For the case of over or under pronation, the region may be on the lateral side or medial side. Pressure may be applied with the nozzle tip 726 to continuously compact the core reinforced filament 2a toward the footwear insole shape as the core reinforced filament is fused to the fill material. A cutter 8A, operating along the filament 2a in a location where the filament 2a is stiff and being fed forward, cuts the filament 2a to form successive areas of reinforcement in the insole.

The region or regions of anisotropic fiber stiffness may be printed with a majority of fiber swath lengths in a layer extending in a same direction, or concentrically.

The region or regions of anisotropic fiber stiffness may be printed together with fill material that may be stiff, elastomeric, or foam:

(a) to reinforce sides of a heel cup in heel region f13 (to assist in preventing over pronation at the calcaneus). The reinforcement may include 3D printed continuous, random, or combined continuous/random fiber reinforcement within a plastic/resin fill material as discussed herein. The reinforcement fiber may be Kevlar (for, e.g., impact or wear resistance) and/or may be carbon fiber (for, e.g., high strength to weight ratio).

(b) within a foam layer from the heel region f13 of the orthotic/insole/insert OI to the distal end of a top cover, for shock absorption and/or cushioning (especially in full length orthotics), or (c) as a soft foam/elastomer pad placed at the distal portion of an orthotic OI to the sulcus, with a metatarsal pad. The reinforcement may include 3D printed continuous, random, or combined continuous/random fiber reinforcement within an elastomer, foam, or resilient plastic/resin fill material as discussed herein. The reinforcement fiber may be Kevlar (for, e.g., impact or wear resistance) and/or may be carbon fiber (for, e.g., high strength to weight ratio).

(d) within a firm posting material added to a distal portion of the plantar surface of an orthotic OI to stabilize, invert or evert the forefoot. The reinforcement may include 3D printed continuous, random, or combined continuous/random fiber reinforcement to form stiff structures, with reinforcement at top and bottom for higher moment of inertia via sandwich panel and/or QI sandwich panel structures.

(e) to extend a lateral border of an orthotic OI vertically upward to provide containment around the lateral longitudinal arch (LLA).

(f) to extend a medial border of the orthotic OI is upward to provide containment around the medial longitudinal arch (MLA).

(g) to extend a horseshoe shaped pad around the periphery of the heel cup HC to lift the calcaneus and relieve pressure.

(h) to surround a hole cut through the orthotic OI shell under the calcaneus.

(i) to reinforce a lateral rearfoot skive, lowering, or grind at 15 degrees into the lateral aspect of a cast or default foot-receiving shape to a depth of 1-10 mm to correct for oversupination, preferably together with an extrinsic rearfoot post and a heel cup HC.

(j) to reinforce a medial rearfoot skive, lowering, or grind at 15 degrees into the medial aspect of a cast or default foot-receiving shape to a depth of 1-10 mm to correct for over pronation, preferably together with an extrinsic rearfoot post and a heel cup HC.

(k) to reinforce a $1^{st}$ metatarsal cutout to an orthotic OI shell under the 1st metatarsal-phalangeal joint at the distal-medial aspect of the orthotic OI shell.

(l) to reinforce a sub metatarsal accommodation as a foam (resilient) pad placed at the distal portion of an orthotic OI which extends to the sulcus and is cut away under those metatarsal head(s) where relief is sought, to offload the specified metatarsal(s) and balance the forefoot.

(m) to reinforce a metatarsal pad as a domed shape foam pad to lift and spread the metatarsals, recreating the transverse arch, placed preferably centrally at the distal edge of the orthotic OI shell.

(n) to reinforce a Morton's Extension foam pad placed under a 1st metatarsal-phalangeal joint, from the distal end of an orthotic OI shell to the distal phalangeal joint, to raise and slightly immobilize the great toe, preferably available with a full length orthotic OI and a metatarsal pad.

(o) to reinforce a neuroma pad as a teardrop shaped pad placed at an interdigital space to spread the specified metatarsals.

(p) to reinforce a rearfoot extrinsic post as firm posting material added to the plantar surface of the orthotic OI heel to add stability and/or correct for over pronation.

(q) to reinforce an arch as a foam or elastomer arch fill laminated to the plantar surface of the orthotic OI to add rigidity to the orthotic OI, particularly for >100 kg users.

(r) to reinforce a reverse Morton's Extension as a foam pad under the 2-5 metatarsal-phalangeal joints to the sulcus to take pressure off the 1st metatarsal-phalangeal joint and slightly dorsiflex the $1^{st}$, preferably with a metatarsal pad.

(s) to reinforce a cover placed under the forefoot of sulcus or full length orthotics OI to add rigidity to sulcus or a full length top covers.

FIGS. 4A-4C show fiber reinforcement in different regions of orthotic inserts or insoles OI, using different fiber placement. In this example, the overall insert OI may be formed in nylon, and reinforcing fiber is formed in several layers. In the following description, unless otherwise specified, "several" means from 2 to 20.

In particular, a varus wedge VW1 (on medial side f15) of orthotic/insert OI1 is reinforced in each layer by several rows of fiber reinforcement following the contour of the varus wedge. Overall, the varus wedge VW1 (on medial side f15) is stiffened by stacked layers of fiber reinforcement f70. Fiber reinforcement f70 is traced about or within the varus wedge VW1 on the medial side f15 in from 10-50 or more layers, or in 0.5 to 2 cm thicknesses, significantly stiffens this region of the insert. The perimeter of the heel cup HC1 in the heel region f13 may be reinforced by several rows of fiber reinforcement f70, and/or also by several stacked layers of fiber reinforcement f70, in a spiral or offsetting pattern. The midfoot region f12 behind metatarsal prominences MF1 (e.g., and/or midsole f31) may be stiffened by several rows of fiber reinforcement f70, and/or also by several stacked layers of fiber reinforcement f70, in a boustrophedon or parallel row pattern, and/or in a quasi-isotropic orientation code or anisotropic orientation code laminate structure. The perimeter of the entire insert OI1 may be reinforced by several rows of fiber reinforcement f70, and also by several stacked layers of fiber reinforcement f70, in a concentric pattern spiraling from the outer perimeter of the insert OI1 inwardly. In contrast, the forefoot region f11 may have less fiber reinforcement than the vagus wedge VW1, f31, and may be less stiff, even if of the same thickness.

FIGS. 4D-4E show fiber reinforcement surrounding an embedded sensor ES1 in an insole, insert, or orthotic OI2.

In particular, a perimeter of the heel cup HC1 in the heel region f13 is reinforced by several rows of fiber reinforcement f70, and also by several stacked layers of fiber reinforcement f70, in a spiral or offsetting pattern. An embedded sensor ES1 is surrounded by both the fill material 18 and the fiber reinforcement f70 pattern about the heel cup HC1. When printing the orthotic/insert OI2, the continuous printing of successive layers may be stopped by the printer in order to allow the sensor to be inserted, then the printer resumes printing to cover the sensor ES1 and its lead wire LW1. The midfoot region f12 behind metatarsal prominences MF1 is stiffened by several rows of fiber reinforcement f70, and also by several stacked layers of fiber reinforcement f70, in a boustrophedon or parallel row pattern, and/or in a quasi-isotropic orientation code or anisotropic orientation code laminate structure. The pattern on the top surface of the insert OI2 and the bottom surface of the insert OI2 may be parallel but different patterns, each conforming to the contact area of the insert OI2.

FIG. 4F shows fiber reinforcement on one side of a cleat sole as an athletic outsole AI1, forming a rock plate. For the purposes of this description and claims, athletic outsole AI should be considered encompassed by the term sole f30 or orthotic insert OI when the functionality of the athletic outsole AI includes or is included by the functionalities described herein with reference to soles f30 and orthotic inserts OI.

In particular, an outsole inner side OS-I includes, with sufficient layer area to cover the entire sole f30 a multi-directional fill of puncture resistant fiber (e.g., Kevlar in a quasi-isotropic orientation code). At least one layer of puncture resistant fiber f70 is arranged in tight boustrophedon rows covering substantially the entire sole. Optionally, one or more additional layers is printed adjacent the first layer, optionally in a direction transverse to the first layer. In this application, a low angle quasi-isotropic orientation code of a higher number of plies (e.g., with 6 repeating plies and 6 different angles, e.g., [0/+/−30/+/−60/90]) may resist puncture better than a sparse orientation code. A raised cleat may be formed on the opposite surface OS-O of the athletic outsole AI1. The interior of the raised cleats may be filled with fiber reinforcement in quasi-isotropic or concentric or spirally deposited continuous fiber reinforcement.

FIGS. 4G-4I show a longitudinal stiffening reinforcement LS extending along the length of a sole plate, gait plate or similar insole OI. Orthotic Insert OI3 includes a substantially constant width strip of race-track shaped concentric fiber swaths LS1 as a longitudinal stiffening pattern LS1, curving toward the medial side of the insole. This pattern may be deposited in several layers, or in several layers separated at midpoint by fill material only (e.g., a sandwich panel structure with reinforcing fiber concentrated at top and bottom). Alternatively, the longitudinal stiffening pattern LS1 may curve toward the lateral side (e.g., about the medial side). An appropriate curvature of reinforcement (including a straight pattern) may stiffen the insole OI3 in a manner to prevent or correct overpronation or oversupination.

In contrast, FIG. 4H shows an asymmetrical, yet curving longitudinal stiffening pattern LS2. This pattern is wider at the toe region and narrower at the heel region f13, and may thereby be stiffer side-to-side or versus twisting in the tow region than in the heel region, and in comparison to FIG. 4G, stiffer in the toe region overall. In addition, should the pattern of FIG. 4H (or a complementary pattern) be formed on a plate-like insole UI4 on each of top and bottom (or inner and outer) sides, then the moment of inertia of the fiber structure in cross section is resistant to bending of the plate, pattern LS2 being stiffer side to side than pattern LS1.

Still further in contrast, FIG. 4I shows an asymmetrical, yet curving longitudinal stiffening pattern LS2, in combination with a complementary yet different pattern on an opposite side or face of the insert OI5. The overall perimeter of the insert/insole OI5 is stiffened, and the center area of the insert/insole OI5 along the longitudinal stiffening pattern LS2 may resist bending more than the medial or lateral sides.

FIGS. 4J-4K show a full-area insole or insert stiffening pattern, showing an insole OI outer surface IS-O and the insole inner surface IS-I. As shown, the overall perimeter of the insert/insole OI6 is stiffened and reinforced on both lateral and medial sides. The inner surface has a complete surrounding, but the outer surface IS-O loops not at the toe but at the midfoot region f12 behind metatarsal prominences. Several rows and/or several layers of reinforcing fiber swaths 2a are laid along the midfoot. Accordingly, as shown in FIGS. 4J and 4K, the insole/insert OI6 may be expected to be less stiff in the forefoot f11 region (where only one surface of the insole/insert OI6 is reinforced), yet slightly stiffer just at the midfoot region MF1 (f12). It should be noted that "stiffened" as discussed herein and throughout may mean of comparatively higher elastic modulus overall, of comparatively higher ultimate tensile strength overall, or of comparatively more hardness, impact or puncture resistance overall.

FIGS. 5A-5E show a first set of examples of an upper f20 component manufacturing or prototyping method in which printed material f70 (containing at least one, and preferably two or more fiber swaths 2c as well as at least one fill material 18 swath) is applied to form part of or all of an upper f20. As shown in FIG. 5A, the print bed 16 receives the upper f20 as printed, or an upper f20 blank upon which printed material f70 is applied. In contrast to the application of only fill material 18, the application of a combination of continuous composite fiber swaths 2c as well as fill material 18 (as shown in FIG. 5B) permits the applied printed material f70 to be considerably stiffer and stronger (e.g., carbon fiber or fiberglass), or more durable (e.g., aramid or Kevlar) than the underlying upper f20 material.

As shown in FIG. 5B, an exemplary printed material f70 stack (hereinafter optionally interchangeable with first continuous fiber 41 and second continuous fiber 42) could include several, preferably 2-10 fiber swaths 2c, covered and surrounded by several, preferably 5-15 rows of fill material 18. As shown in FIG. 5B, the printed material f70 stack may include swaths and rows that stack vertically or are offset from one another vertically. The matrix material 4a of the fiber swaths 2c, the fill material 18, and the upper blank f20, if any, may generally be of a first order of magnitude of elastic modulus (e.g., a thermoplastic resin having an unmelted elastic modulus of approximately 0.1 through 5 GPa and/or unmelted ultimate tensile strength of approximately 5 through 100 MPa, and a melted elastic modulus of less than 0.1 GPa and melted ultimate tensile strength of less than 10 MPa). The axial fiber strands 6a of the fiber swaths 2c are of at least ten (10) times higher (and preferably 20-100 times higher) elastic modulus and/or ultimate tensile strength than the matrix material, fill material, and/or fabric or sheet of the upper blank 20 (e.g., an elastic modulus of approximately 5-1000 GPa and an ultimate tensile strength of approximately 200-100000 MPa).

A blank or base layer may be formed from a web, sheet, or fabric having an unmelted elastic modulus from ranges from 0.001 to 0.1 GPa and an unmelted ultimate tensile strength ranges of approximately 5 through 100 MPa.

Continuous reinforced filament—e.g., continuous reinforced filament as printed material f70, is depicted in FIGS. 5A-5C as extending downward from the lace apertures f41 and toward the sole f30 structure. More particularly, segments of the continuous reinforced filament as printed material f70 may extend from a throat region of the upper f20 (i.e., a region where the laces f41, lace apertures f40, and tongue f60 are located) to a lower region of the upper f20 (i.e., where the sole f30 structure joins with the upper f20.

As shown in FIGS. 5A, 5C a first array of parallel continuous reinforced filaments as printed material f70 may be oriented in a generally vertical direction in an area between the lace apertures f41 and the sole structure f30, looping the lace apertures f41, while a second array of interleaved continuous reinforced filaments as printed material f70 may be oriented to reinforce a toe portion of the upper f20 structure. The orientations for the continuous reinforced filaments may assist with cutting motions and braking motions; for example, the first array may resist stretch in the upper f20 from cutting motions (e.g., may use fiber strands of a higher Young's modulus material such as carbon fiber or fiberglass), and the second array may reinforce the toe versus wear (e.g., may use strands of durable aramid).

As shown in FIGS. 5A-5E, and as shown in FIGS. 6A-6I, an upper f20 may include a base layer or layers f43 and subsequent layer(s) f44 of deposited fill material 18 and/or continuous fiber reinforced filament 2c as printed material f70, and a deposition layer f44 for covering over reinforcing fiber as printed material f70. Continuous reinforced filament f70 may be deposited as printed material f70 or reinforcing fiber p41, or p42, located adjacent to and parallel to an inner (e.g., first) and/or outer (e.g., second) surface of the base layer f43. A further deposition layer f44 may cover the first surface and the continuous reinforced filament.

Continuous reinforced filament—e.g., continuous reinforced filament p41, p42, is depicted in FIGS. 6A-6I, as extending downward from the lace apertures f41 and toward the sole f30 structure. More particularly, segments of the continuous reinforced filament may extend from a throat region of the upper f20 (i.e., a region where the laces f40, lace apertures f41, and tongue f60 are located) to a lower region of the upper f20 (i.e., where the sole f30 structure joins with the upper f20). As shown in FIGS. 6A, 6B, a first array p41 of parallel continuous reinforced filaments may be oriented in a generally vertical direction in an area between the lace apertures f41 and the sole structure f30, while a second array p42 of parallel continuous reinforced filaments may be oriented in a rearwardly-angled direction in the area between lace apertures f41 and the heel portion of the sole structure f30. The orientations for the continuous reinforced filaments may assist with cutting motions and braking motions; for example, the first array p41 may resist stretch in the upper from cutting motions, and the second array p42 may resist stretch in the upper from braking, jumping, or flexing motions.

Although some types of continuous fiber filament arrays may stretch, the fiber strands should generally stretch to a lesser degree than the other base layer f43 or deposition layer f44 fabric, sheet, or web forming the overall shape of the upper f20.

Each of the continuous fiber filament may be located to form structural components in the upper f20 that (a) resist stretching in specific directions or locations, (b) limit excess movement of the foot relative to sole structure and the upper, (c) ensure that the foot remains properly positioned relative to sole structure and the upper, and (d) reinforce locations where forces are concentrated.

As noted matrix material of the continuous fiber composite filament preferably comprises a thermoplastic resin having an unmelted elastic modulus of approximately 0.1 through 5 GPa and/or unmelted ultimate tensile strength of approximately 5 through 100 MPa, and a melted elastic modulus of less than 0.1 GPa and melted ultimate tensile strength of less than 10 MPa, while the one or more axial fiber strands within the filament may have an elastic modulus of approximately 5-1000 GPa and an ultimate tensile strength of approximately 200-100000 MPa. The base layer may be formed from a web, sheet, or fabric having an unmelted elastic modulus from ranges from 0.001 to 0.1 GPa and an unmelted ultimate tensile strength ranges of approximately 5 through 100 MPa.

Each continuous fiber filament shown may include between 100 and 6000 overlapping axial strands or parallel continuous axial strands. Matrix materials may include acrylonitrile butadiene styrene, epoxy, vinyl, nylon, polyetherimide, polyether ether ketone, polyactic acid, or liquid crystal polymer, and such axial strand materials include carbon fibers, aramid fibers, fiberglass, ultra high molecular weight polyethylene, basalt and/or liquid crystal polymer.

Although the first parallel array p41 and the second parallel array p41 may be formed from similar materials, the second parallel array p42 strands may be formed to have a greater tensile strength than the first parallel array p41 strands, either by using the same material in greater cumulative cross sectional area or different materials.

A printing substrate that may become or be part of an upper f20 is depicted in FIG. 6A. A printing substrate may form a majority of the lateral side and/or medial side. As shown in FIG. 6A, the printing substrate has a configuration that extends from the lace region to the lower region of the lateral side 14 and through the forefoot f11, midfoot f12, and/or heel f13 regions; that defines lace apertures f41; and that forms an interior surface that contacts the foot and an exterior exposed surface.

A base layer f43 and a deposition layer f44 may lay adjacent to each other, and/or with continuous fiber composite filament positioned between them, substantially parallel to the surfaces of the base layer f43 and/or deposition layer f44. The continuous fiber composite filament may resist stretch in directions that correspond with the surfaces of the base layer f43 and/or deposition layer f44. The continuous fiber composite filament arrays may lie adjacent to a surface of the base layer f43 and substantially parallel to the surface of base layer f43 for distances of five centimeters or more in a single substantially straight path, and may be formed in a plurality (e.g., several) of layers and in continuous groups.

A base layer f43 and a deposition layer f44 may have substantially the same shape and size, and/or have substantially corresponding edges (i.e., outer contours or perimeter). The base layer f43 and/or deposition layer f44 may be cut to shape after the continuous fiber composite filament arrays are printed as printed material f70, p41, and/or p42, optionally skirting terminating ends or return loops of the continuous fiber composite filament arrays f70, p41, and/or p42 as printed, or severing the composite filaments f70, p41, and/or p42 as printed.

Suitable materials for base layer f43 include textiles, polymer sheets, or combinations of these: textiles and polymer sheets, for example. The textiles may incorporate fibers that are arranged to impart one-directional stretch or multi-directional stretch; include coatings that form a breathable and water-resistant barrier; or include mesh materials or perforated materials to impart greater breathability or air permeability.

Deposition layer f44 may be formed or built-up directly upon base layer f43 and filaments, swaths, ranks, or strands f70, p41, and/or p42 e.g., from relatively small drops of a material, or a liquid form of a material 1 through spraying, printing, electroplating, filament accumulation, or similar processes, or a pre-formed polymer sheet.

The thickness of deposition layer f44 may be of greater thickness in the areas of swaths and lesser thickness in areas where swaths are absent.

In certain configurations of footwear f10, various segments of swaths may be absent, or additional swaths or segments of swaths may be present to provide further structural components in footwear f10. For example, four segments of swaths may radiate outward from each lace aperture f41 and extend toward sole f30 structure. Alternatively or in addition, additional segments of swaths may extend through each of regions f11-f13 to provide longitudinal support, and further swaths may extend through heel region f13 to form a heel counter that resists heel movement. Indicia layer f45 may be formed from an ink or other material with a second color. Additional layers may be located to form an interior portion of upper f20 that is adjacent to the void, e.g., a layer may be a polymer foam layer that enhances the overall comfort of footwear f10; a layer may be a moisture-wicking textile that removes perspiration or other moisture from the area immediately adjacent to the foot; and/or a backing layer may extend over the additional set of swaths.

In each of FIGS. 5A-5E and 6A-6H and the description thereof, a single swath 2c or a group of swaths f70 (2c), or a stack of several combined swaths 2c and fill material 18 may surround or reinforce a lace aperture f41 or other hole. In each case, any of the structures of FIGS. 2B-2F, for one swath or a group of swaths, may be used to surround or reinforce the aperture f41 or other hole. In addition, simple once-around then return loops such as depicted in 5A-5E about lace apertures, and/or loops that go a plurality of loops or coils about an aperture f41 such as depicted in FIGS. 6A-6H, may be used.

FIGS. 7A-7E depict ring-shaped reinforcement structures f155, f151, f152, separated by clearances or intervals f161, through which base material or substrate layer f140, f162 is exposed. As discussed herein, and as shown in FIG. 7D, each reinforcement structure, patch or ring (e.g., f155) may be a continuous fiber reinforcement region, e.g., a patch of back-and-forth tightly compacted boustrophedon rows; and/or a set of concentric, offset, or spiraling rings; and/or a set of several complementary patches of different types stacked up (e.g., as shown in FIGS. 3A-3D and discussed with respect thereto).

A lateral side and medial side may include a substrate layer and a ring layer f150 that selectively stretches or accommodate movement of the foot. Substrate layer f140 may be formed from a material that stretches in one direction or with multi-directional stretch (e.g., elastane fabric). The ring layer f150 may stretch less than the substrate layer f140, the shape of the rings selectively inhibiting stretch in the substrate layer f140. In particular as discussed herein, the fiber patterns within the rings may inhibit stretch in the substrate layer f140. The substrate layer 140 may include an outward-facing surface f141, an inward-facing surface f142, multiple joined elements, perforated or otherwise non-continuous structure. The ring may include multiple concentric rings f155, including or alternatively a first, second, and third rings 151, on lateral side 131 and first, second, and third rings 151 on medial side 132.

The concentric rings, e.g., f151 may have a central area or approximate centroid area to each at the interface of a forefoot region f11 and midfoot region f12, e.g., generally corresponding with locations of the metacarpo-phalangeal joints (i.e., joints between the metacarpals and phalanges) of the foot received by upper f130; or located on tongue f60 or in heel region f13; or may exhibit an elongate and/or non-regular configuration; and/or regular and non-regular shapes, mixed or otherwise; and/or in greater or lesser numbers. The rings, e.g., f151, may be located on the outer surface f140 or inner surface f141 of the upper f130, or both, in matching or contrasting configuration, or between various material layers.

Outward forces upon upper f130 (i.e., forces directed outward from the foot within upper f130) may place upper f130 in tension and may stretch portions of upper 130, and exposing portions of substrate layer f140 may permit greater stretch, therefore, in those portions of upper f130 where ring layer f150 is absent. That is, the selective formation of incisions and removed areas may be utilized to control the stretch properties of upper f130.

Alternatively or in addition, rings 155, 151, 152, may be positioned to correspond with or mimic the topography of a foot (of an individual, scanned in, or of a default shape) and/or the amount of variability and stretch, e.g., separation between rings may be spaced closer to one another where foot topography is more curved and farther away where foot topography is relatively flat.

The Figures also contemplate a subtractive method in which shapes (channels, depressions) within a flat upper f20, f130 blank are selectively removed (by machining, dissolving, etc.) to change the mechanical properties of the flat upper blank. The machined flat upper f20, f130 blank is joined to other footwear parts to form an article of footwear. The blank may incorporate different layers of differing function (e.g., waterproof, wear resistant, etc.).

As shown in FIG. 7E, the rings may alternatively be patches of first and second materials p41, p42, in which different configurations of fiber reinforcement impart different properties.

In general, a scanning process (either optical or mechanical) may create a scanned foot mesh is used to customize an orthotic OI shape, which may then be printed to, and possibly also subsequently milled, of a homogenous material. Using fiber reinforcement with directional or complementary fills, the internal structure of the orthotic OI may be designed to be multi-material and/or of anisotropic reinforcement.

An internet based production system for orthotic insoles, that is, orthotic insoles that are used to support or correct impaired joints or limbs, or joints or limbs that may undergo extreme (e.g., athletic) stresses may rely upon custom orthotic insoles based on (1) a photograph, 2D scan, or 3D scan of a target foot, (2) a 3D mesh or model of an orthotic appliance, formed using (1), and which may be manipulated for corrective purposes and/or (3) a foot pressure scan or sampling of the target foot, e.g., EMED, PEDAR, or Tekscan files, and/or (4) medical imaging of the target foot.

Some data structures for insoles OI manufacture may be solid model or mesh with fiber placement separately or integrally stored as additional data (e.g., per layer). The mesh or solid model of a base insole, orthotic, or gait plate OI, or sole f30 (e.g., a template or scan in default form) may be manipulated by (1) creating pad forms, arbitrarily and/or at metatarsal locations, appended the surface of the insole that serve to redistribute forces in the patient's foot (2) creating pockets or recesses to alleviate pressure on injured or irregular surfaces of the foot (3) adjusting front, rear heights (4) adding or subtracting arch support for the longitudinal arch area and/or (5) adding or subtracting plateaus, areas, or multipoint heights. The insole OI mesh may be elevated in parts of the insole OI to making the insole OI thinner or for create shoe fillings in cases of amputated feet or other deformities; or deformed for deepening or raising the edges of the insole, for creating channels for releasing pressure from the plantar fascia, or for designing a heel cup HC, which is important in cases of tendonitis, bursitis, and partial or total ruptures of the Achilles tendon. Free form raised or recessed areas may be defined polygonally by setting points on the surface of the insole OI and raised, with convex or prism surfaces. The thickness of the insole OI may be changed, a lateral tilt for pronation or supination may be defined, and the heel may be defined by length, width, and height difference. Smoothing, scaling, and mirroring may be applied.

A 3D printing process for custom orthotics OI may include the concepts of (a) exposing 3D printing infill or honeycombing patterns, in particular triangular infill (b) providing intersecting or overlapping internal meshes which may have a different or denser infill pattern than the surrounding mesh (c) avoiding printing perimeters around the intersections between meshes.

In some embodiments, a stiffness gradient can be generated along or following the height direction of the sole f30, or orthotic, insole, or gait plate OI by increasing or decreasing the amount of fiber or core reinforced filament deposited in the height direction.

In some embodiments, a stiffness gradient can be generated along a lateral direction (e.g., normal to the metatarsal line) by increasing or decreasing the amount of fiber or core reinforced filament deposited in the lengthwise or longitudinal direction. For example, several of FIGS. 4A-4K show exemplary insoles, orthoses or inserts OI in which stiffening patterns are formed in the transverse direction at an approximate metatarsal location, along a lateral line of bending of the foot with the ground. The stiffening patterns are alternatively or in addition integrated or provided in outsoles f32 or soles f30. A different pattern is formed on each of inner and outer surface of the exemplary member.

In some embodiments, a void may be left underneath a network or lattice of fiber reinforced deposition to form a trampoline structure for receiving a heel or another part of a foot.

A "composite swath" or "composite swath" may refer to a deposited fiber-reinforced composite filament, having been compressed, consolidated and widened by ironing during deposition. Extending within the composite swath are a plurality of individual fibers, from 50-5000, preferably 100-2000, within a matrix material.

A "multi-swath track" may refer to a set of parallel swaths that generally follow parallel paths, although individual swaths may deviate to avoid obstacles or achieve reinforcement goals.

A "loop" or "crossed loop" may refer to a toolpath, composite swath, or multi-swath track that jumps or crosses over itself.

A "crossing turn" may be a "loop" that loops about a contour, to directly surround the contour, or surround the contour at an offset from walls formed of fill material. "Loops" and "crossing turns" are "underhand loops" unless otherwise described.

The generally diamond-shaped crossing of two bonded ranks or two composite swaths, including those occurring in a loop or crossing turn, may be described as a "crossing point".

A "bight" or "open loop" may mean a curved section of toolpath or composite swath, generally curved in a manner in which the toolpath or composite swath does not touch itself upon return from the curve (at least locally).

A "touching loop" may refer to a curved toolpath or composite swath that loops back to touch itself.

A "fold" may refer to a composite swath which folds, twists, or bunches over itself along a curved segment of composite swath (such as a corner).

A "standing end" may refer to a portion of a fiber reinforced filament that remains undeposited, e.g., within the printhead or upstream.

A "running end" may refer to a terminal, distal, or cut end of the swath deposited within the part.

"Fill material" includes material that may be deposited in substantially homogenous form as extrudate, fluid, or powder material, and is solidified, e.g., by hardening, crystallizing, transition to glass, or curing, as opposed to the core reinforced filament discussed herein that is deposited as embedded and fused composite swaths, which is deposited in a highly anisotropic, continuous form. "Substantially homogenous" includes powders, fluids, blends, dispersions, colloids, suspensions and mixtures, as well as chopped fiber reinforced materials.

"Honeycomb" includes any regular or repeatable tessellation for sparse fill of an area (and thereby of a volume as layers are stacked), including three-sided, six-sided, four-sided, complementary shape (e.g., hexagons combined with triangles) interlocking shape, or cellular.

A "Negative contour" and "hole" are used herein interchangeably. However, either word may also mean an embedded contour (e.g., an embedded material or object) or a moldover contour (e.g., a second object with surfaces intruding into the layer).

"Outwardly spiraling" or "outwardly offsetting" meaning includes that a progressive tracing, outlining, or encircling is determined with reference to an innermost, generally negative or reference contour, not necessarily that the composite swath mush begin next to that contour and be built toward an outer perimeter. Once the toolpath is determined, it may be laid in either direction. Similarly, "inwardly spiraling" or "inwardly offsetting" means that the progressive tracing is determined with reference to an outer, generally positive contour.

"3D printer" meaning includes discrete printers and/or toolhead accessories to manufacturing machinery which carry out an additive manufacturing sub-process within a larger process. A 3D printer is controlled by a motion controller 20 which interprets dedicated G-code (toolpath instructions) and drives various actuators of the 3D printer in accordance with the G-code.

"Extrusion" may mean a process in which a stock material is pressed through a die to take on a specific shape of a lower cross-sectional area than the stock material. Fused Filament Fabrication ("FFF"), sometimes called Fused Deposition Manufacturing ("FDM"), is an extrusion process. Similarly, "extrusion nozzle" shall mean a device designed to control the direction or characteristics of an extrusion fluid flow, especially to increase velocity and/or restrict cross-sectional area, as the fluid flow exits (or enters) an enclosed chamber.

A "conduit nozzle" may mean a terminal printing head, in which unlike a FFF nozzle, there is no significant back pressure, or additional velocity created in the printing material, and the cross sectional area of the printing material, including the matrix and the embedded fiber(s), remains substantially similar throughout the process (even as deposited in bonded ranks to the part).

"Deposition head" may include extrusion nozzles, conduit nozzles, and/or hybrid nozzles.

"Filament" generally may refer to the entire cross-sectional area of an (e.g., spooled) build material, and "strand" shall mean individual fibers that are, for example, embedded in a matrix, together forming an entire composite "filament".

"Alternating", with respect to reinforcement regions, generally means in any regular, random, or semi-random strategy, unless the pattern is described, specified, or required by circumstances, for distributing different formations within or among layers. E.g., simple alternation (ABABAB), repeating alternation (AABBAABB), pattern alternation (ABCD-ABCD), randomized repeating groups (ABCD-CBDA-CDAB), true random selection (ACBADBCABDCD), etc.

"Shell" and "layer" are used in many cases interchangeably, a "layer" being one or both of a subset of a "shell" (e.g., a layer is an 2.5D limited version of a shell, a lamina extending in any direction in 3D space) or superset of a "shell" (e.g., a shell is a layer wrapped around a 3D surface). Shells or layers are deposited as 2.5D successive surfaces with 3 degrees of freedom (which may be Cartesian, polar, or expressed "delta"); and as 3D successive surfaces with 4-6 or more degrees of freedom. Layer adjacency may be designated using descriptive notations "$LA_1$," "$LA_2$" or $LA_n$, $LA_{n+1}$", etc., without necessarily specifying unique or non-unique layers. "$LA_1$" may indicate the view shows a single layer, "$LA_2$" indicating a second layer, and "$LA_1$, $LA_2$" indicating two layers superimposed or with contents of each layer visible. For example, in a top down view, either of "$LA_1$, $LA_2$, $LA_3$" or "$LA_n$, $LA_{n+1}$, $LA_{n+2}$" may indicate that three layers or shells are shown superimposed. "$LA_1$, $LA_2$ ... $LA_m$," may indicate an arbitrary number of adjacent layers (e.g., m may be 2, 10, 100, 1000, or 10000 layers).

Some representative Ultimate/Tensile Strength and Tensile/Young's Modulus values for reinforcing fibers, core reinforced fiber matrix materials, fill materials, and comparative materials are as follows:

| MATERIAL | Ultimate Strength MPa | Young/Tensile Modulus GPa |
| --- | --- | --- |
| reinforcing strands - UHMWPE- Dyneema, Spectra | 2300-3500 | 0.7 |
| reinforcing strands - Aramid or Aramid Fiber - Kevlar, Nomex, Twaron | 2000-2500 | 70.5-112.4, 130-179 |
| reinforcing strands - Carbon Fiber | 4000-4500 | 300-400 |
| reinforcing strands - Glass Fiber (E, R, S) | 3500-4800 | 70-90 |
| reinforcing strands - Basalt fiber | 1300-1500 | 90-110 |
| Carbon Fiber reinforced plastic (70/30 fiber/matrix, unidirectional, along grain) | 1600 | 170-200 |
| Glass-reinforced plastic (70/30 by weight fiber/matrix, unidirectional, along grain) | 900 | 40-50 |
| Steel & alloys ASTM A36 | 350-450 | 200 |
| Aluminum & alloys | 250-500 | 65-80 |
| matrix, fill material, solidifiable material - Epoxy | 12-30 | 3.5 |
| matrix, fill material, solidifiable material - Nylon | 70-90 | 2-4 |

What is claimed is:

1. A method of reinforcing a footwear upper, comprising:
supplying a core reinforced filament having a matrix material impregnating reinforcing strands aligned along the filament;
supplying a fill material separately from the core reinforced filament;
depositing at least one shell of fill material within an upper shape upon a print bed;
depositing the core reinforced filament to fuse to the fill material within a first reinforcing region formed with respect to the upper shape;
actuating a cutter upstream of the nozzle tip to cut the core reinforced filament;
depositing a remainder of the core reinforced filament to complete the first reinforcing region; and
applying pressure with a nozzle tip to continuously compact the core reinforced filament toward the upper shape as the core reinforced filament is fused to the fill material.

2. The method according to claim 1, the depositing the core reinforced filament comprising:
depositing the core reinforced filament to form at least one loop of fiber embedded composite swath and at least one loop of fill material about a lace aperture formed in the upper shape.

3. The method according to claim 1, the depositing at least one shell of fill material within an upper shape upon a print bed comprising:
depositing at least one shell of fill material within a fabric upper shape held upon a print bed.

4. The method according to claim 1, the depositing at least one shell of fill material within an upper shape upon a print bed comprising:
depositing the at least one shell of fill material to form an outer perimeter of an upper shape upon a print bed.

5. The method according to claim 1, further comprising:
forming the upper shape into a foot receiving shape; and
affixing a perimeter of the upper shape to the perimeter of a sole.

6. The method according to claim 1, wherein the reinforcing strands are formed from a continuous elongated fiber material having an elastic modulus more than ten times that of the fill material of the upper shape.

7. The method according to claim 1, further comprising, after the cutting, depositing the core reinforced filament to fuse to the fill material to form a second anisotropic reinforcement region having at least one material property oriented in a second direction different from the first direction.

8. The method according to claim 1, wherein the first reinforcing region is deposited in successive shells that vary evenly in fiber direction to form a substantially isotropic reinforcement region having at least one substantially evenly distributed material property.

9. The method according to claim 1, the depositing the core reinforced filament comprising:
depositing the core reinforced filament to form at least one loop of fiber embedded composite swath about every lace aperture formed in the upper shape.

10. The method according to claim 1, the depositing the core reinforced filament comprising:
depositing the core reinforced filament to form at least one loop of fiber embedded composite swath about a lace aperture formed in the upper shape and at least one loop of fiber embedded composite swath at a perimeter of the upper shape for affixing to the perimeter of a sole.

11. The method according to claim 10, wherein the at least one loop of fiber embedded composite swath for affixing to the perimeter of a sole is printed to surround one lace aperture, extend to the perimeter of the upper, follow the perimeter of the upper for at least one quarter of the sole length, then return to loop a second lace aperture.

12. The method according to claim 1, the depositing the core reinforced filament comprising:
depositing a reinforcement patch to reinforce at least one of a wear and a stress area of the upper shape.

13. The method according to claim 1, the depositing the core reinforced filament comprising:
depositing a reinforcement ring to limit stretching of an underlying base layer of material.

* * * * *